US012750120B2

(12) United States Patent
Venugopal et al.

(10) Patent No.: US 12,750,120 B2
(45) Date of Patent: Sep. 29, 2026

(54) BEAM-BASED SPATIAL ADAPTATION WITH ASYMMETRIC ANTENNA PANELS

(71) Applicant: QUALCOMM Incorporated, San Diego, CA (US)

(72) Inventors: Kiran Venugopal, Green Brook, NJ (US); Yan Zhou, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 84 days.

(21) Appl. No.: 18/665,209

(22) Filed: May 15, 2024

(65) Prior Publication Data

US 2025/0357993 A1 Nov. 20, 2025

(51) Int. Cl.
*H04B 7/06* (2006.01)
*H04B 7/08* (2006.01)

(52) U.S. Cl.
CPC ....... *H04B 7/06966* (2023.05); *H04B 7/0802* (2013.01); *H04B 7/088* (2013.01)

(58) Field of Classification Search
CPC ... H04B 7/06966; H04B 7/0802; H04B 7/088
USPC ......................................... 375/262, 267, 299
See application file for complete search history.

(56) References Cited

U.S. PATENT DOCUMENTS 11,356,166 B2 6/2022 Bai et al.
2018/0227035 A1* 8/2018 Cheng .................. H04B 7/0626
2018/0227094 A1 8/2018 Liu et al.
2020/0028652 A1 1/2020 Bai et al.
2020/0067615 A1* 2/2020 Ghanbarinejad .... H04B 7/0691
2020/0228180 A1* 7/2020 Zhang ................ H04B 7/06958
2020/0404544 A1* 12/2020 Ponzini ................. H04W 72/21
2021/0067289 A1* 3/2021 Zhu ........................ H04B 7/088
2021/0135808 A1 5/2021 Choi et al.
2022/0022053 A1* 1/2022 Kakishima ............. H04B 7/086
(Continued)

FOREIGN PATENT DOCUMENTS

WO WO-2020176895 9/2020
WO WO-2023123009 A1 7/2023
WO WO-2024075273 A1 4/2024

OTHER PUBLICATIONS

Partial International Search Report—PCT/US2025/022008—ISA/EPO—Jul. 8, 2025 (2401879WO).
(Continued)

*Primary Examiner* — Emmanuel Bayard
(74) *Attorney, Agent, or Firm* — Holland & Hart LLP

(57) ABSTRACT

Methods, systems, and devices for wireless communications are described. In some examples, a user equipment (UE) may receive a reference signal via a downlink beam from a network entity. The UE may perform measurements on the reference signal and report the measurements to the network entity via a beam report. In some examples, the beam report may indicate a request for uplink sounding at the UE or may indicate a downlink rank associated with each downlink beam indicated in the beam report. T he UE may transmit the beam report in accordance with a trigger condition, such as a change in a quantity of antenna elements of an antenna port of the UE satisfying a threshold. The network entity may schedule a sounding reference signal (SRS) to be transmitted by the UE in accordance with the request, and the UE may transmit the SRS according to the scheduling.

30 Claims, 14 Drawing Sheets

300

(56) References Cited

U.S. PATENT DOCUMENTS

| | | | | |
|---|---|---|---|---|
| 2022/0231823 | A1* | 7/2022 | Shin | H04L 5/0096 |
| 2022/0312225 | A1* | 9/2022 | Li | H04B 7/088 |
| 2022/0369306 | A1* | 11/2022 | Bai | H04B 7/0691 |
| 2023/0094748 | A1* | 3/2023 | Meng | H04L 5/0048 375/267 |
| 2023/0299921 | A1* | 9/2023 | Rahman | H04L 5/0051 370/329 |
| 2024/0056247 | A1* | 2/2024 | Muruganathan | H04B 7/06952 |
| 2025/0159679 | A1* | 5/2025 | Babaei | H04W 72/21 |

OTHER PUBLICATIONS

Huawei, et al., "Beam Measurement and Reporting", 3GPP TSG RAN WG1 Meeting #90bis, R1-1717301, 3rd Generation Partnership Project, Mobile Competence Centre, 650, Route Des Lucioles, F-06921, Sophia-Antipolis Cedex, France, vol. RAN WG1, No. Prague, Czech Republic; Oct. 9, 2017-Oct. 13, 2017, Oct. 8, 2017, 7 Pages, XP051340491, pp. 1-6; figures 2,3,4.

International Search Report and Written Opinion—PCT/US2025/022008—ISA/EPO—Oct. 24, 2025 (2401879WO).

Vivo: "Other Aspects on AI/ML for Beam Management", 3GPP TSG RAN WG1 #111, R1-2211001, Type Discussion; FS_NR_AIML_AIR, 3rd Generation Partnership Project, Mobile Competence Centre, 650, Route Des Lucioles, F-06921, Sophia-Antipolis Cedex, France, vol. RAN WG1, No. Toulouse, FR; Nov. 14, 2022-Nov. 18, 2022, Nov. 7, 2022, 31 Pages, XP052221566, pp. 2,4-5.

* cited by examiner

BEAM-BASED SPATIAL ADAPTATION WITH ASYMMETRIC ANTENNA PANELS

FIELD OF TECHNOLOGY

The following relates to wireless communications, including beam-based spatial adaption with asymmetric antenna panels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Components within a wireless communication system may be coupled (for example, operatively, communicatively, functionally, electronically, and/or electrically) to each other.

SUMMARY

The systems, methods, and devices of this disclosure each have several innovative aspects, no single one of which is solely responsible for the desirable attributes disclosed herein.

A method for wireless communications by a user equipment (UE) is described. The method may include receiving, from a network entity, one or more downlink reference signals (DLRS) via one or more receive beams of the UE, performing one or more measurements of the one or more DLRS, and transmitting a beam report based on a capability of the UE and on the one or more measurements of the one or more DLRS, the beam report including a request to perform uplink sounding at the UE or including one or more respective downlink rank indicators associated with respective beams of the one or more receive beams.

A UE for wireless communications is described. The UE may include one or more memories storing processor executable code, and one or more processors coupled with (e.g., operatively, communicatively, functionally, electronically, or electrically) the one or more memories. The one or more processors may individually or collectively be operable to execute the code (e.g., directly, indirectly, after pre-processing, without pre-processing) to cause the UE to receive, from a network entity, one or more DLRS via one or more receive beams of the UE, perform one or more measurements of the one or more DLRS, and transmit a beam report based on a capability of the UE and on the one or more measurements of the one or more DLRS, the beam report including a request to perform uplink sounding at the UE or including one or more respective downlink rank indicators associated with respective beams of the one or more receive beams.

Another UE for wireless communications is described. The UE may include means for receiving, from a network entity, one or more DLRS via one or more receive beams of the UE, means for performing one or more measurements of the one or more DLRS, and means for transmitting a beam report based on a capability of the UE and on the one or more measurements of the one or more DLRS, the beam report including a request to perform uplink sounding at the UE or including one or more respective downlink rank indicators associated with respective beams of the one or more receive beams.

A non-transitory computer-readable medium storing code for wireless communications is described. The code may include instructions executable by one or more processors (e.g., directly, indirectly, after pre-processing, without pre-processing) to receive, from a network entity, one or more DLRS via one or more receive beams of the UE, perform one or more measurements of the one or more DLRS, and transmit a beam report based on a capability of the UE and on the one or more measurements of the one or more DLRS, the beam report including a request to perform uplink sounding at the UE or including one or more respective downlink rank indicators associated with respective beams of the one or more receive beams.

In some examples of the method, UEs, and non-transitory computer-readable medium described herein, transmitting the beam report may include operations, features, means, or instructions for transmitting the beam report including the request to perform uplink sounding at the UE based on a change in a quantity of antenna components of the UE per reference signal port.

Some examples of the method, UEs, and non-transitory computer-readable medium described herein may further include operations, features, means, or instructions for transmitting a sounding reference signal (SRS) based on the beam report including the request to perform uplink sounding at the UE, where the SRS may be scheduled within a quantity of symbols after transmission of the beam report.

Some examples of the method, UEs, and non-transitory computer-readable medium described herein may further include operations, features, means, or instructions for receiving, from the network entity, an indication of a configuration of one or more trigger conditions for the UE, where satisfaction of the one or more trigger conditions triggers the UE to transmit the beam report including the request to perform uplink sounding at the UE, where the one or more trigger conditions include a change in a quantity of antenna components of the UE per reference signal port satisfying a threshold, a quantity of slots prior to transmission of the beam report, or any combination thereof.

In some examples of the method, UEs, and non-transitory computer-readable medium described herein, the configuration indicates that, to transmit the beam report, the threshold for the change in the quantity of antenna components of the UE may be satisfied within a quantity of slots before the UE may be scheduled to transmit the beam report including the request to perform uplink sounding at the UE.

In some examples of the method, UEs, and non-transitory computer-readable medium described herein, transmitting the beam report may include operations, features, means, or instructions for transmitting a reporting quantity dedicated for the request to perform uplink sounding at the UE or for the one or more respective downlink rank indicators based on a capability of the UE to support uplink communications using multiple antenna panels.

In some examples of the method, UEs, and non-transitory computer-readable medium described herein, transmitting the beam report may include operations, features, means, or instructions for transmitting a single bit indicating the request to perform uplink sounding at the UE.

In some examples of the method, UEs, and non-transitory computer-readable medium described herein, transmitting the beam report may include operations, features, means, or instructions for transmitting a set of multiple bits indicating the one or more respective downlink rank indicators associated with the respective beams of the one or more receive beams.

Some examples of the method, UEs, and non-transitory computer-readable medium described herein may further include operations, features, means, or instructions for performing a prediction procedure using a machine learning model to predict a change in a quantity of antenna components of the UE and transmitting the beam report including the request to perform uplink sounding at the UE based on predicting the change in the quantity of antenna components of the UE.

Some examples of the method, UEs, and non-transitory computer-readable medium described herein may further include operations, features, means, or instructions for transmitting a prediction confidence or a sounding pattern associated with uplink sounding at the UE to the network entity.

Some examples of the method, UEs, and non-transitory computer-readable medium described herein may further include operations, features, means, or instructions for transmitting the request to perform uplink sounding at the UE via uplink control information (UCI) signaling or a medium access control-control element (MAC-CE).

A method for wireless communications by a network entity is described. The method may include outputting, to a UE, one or more DLRS via one or more receive beams of the UE, obtaining a beam report including a request to perform uplink sounding at the UE or including one or more respective downlink rank indicators associated with respective beams of the one or more receive beams, and communicating one or more signals with the UE based on the beam report.

A network entity for wireless communications is described. The network entity may include one or more memories storing processor executable code, and one or more processors coupled with (e.g., operatively, communicatively, functionally, electronically, or electrically) the one or more memories. The one or more processors may individually or collectively be operable to execute the code (e.g., directly, indirectly, after pre-processing, without pre-processing) to cause the network entity to output, to a UE, one or more DLRS via one or more receive beams of the UE, obtain a beam report including a request to perform uplink sounding at the UE or including one or more respective downlink rank indicators associated with respective beams of the one or more receive beams, and communicate one or more signals with the UE based on the beam report.

Another network entity for wireless communications is described. The network entity may include means for outputting, to a UE, one or more DLRS via one or more receive beams of the UE, means for obtaining a beam report including a request to perform uplink sounding at the UE or including one or more respective downlink rank indicators associated with respective beams of the one or more receive beams, and means for communicating one or more signals with the UE based on the beam report.

A non-transitory computer-readable medium storing code for wireless communications is described. The code may include instructions executable by one or more processors (e.g., directly, indirectly, after pre-processing, without pre-processing) to output, to a UE, one or more DLRS via one or more receive beams of the UE, obtain a beam report including a request to perform uplink sounding at the UE or including one or more respective downlink rank indicators associated with respective beams of the one or more receive beams, and communicate one or more signals with the UE based on the beam report.

In some examples of the method, network entities, and non-transitory computer-readable medium described herein, communicating the one or more signals may include operations, features, means, or instructions for outputting scheduling information for one or more subsequent downlink messages from the network entity based on the one or more respective downlink rank indicators.

In some examples of the method, network entities, and non-transitory computer-readable medium described herein, communicating the one or more signals may include operations, features, means, or instructions for outputting scheduling information for an SRS based on the beam report including the request to perform uplink sounding at the UE, where the network entity schedules the SRS within a quantity of symbols after reception of beam report.

Some examples of the method, network entities, and non-transitory computer-readable medium described herein may further include operations, features, means, or instructions for outputting, to the UE, an indication of a configuration of one or more trigger conditions for the UE, where satisfaction of the one or more trigger conditions triggers the UE to transmit the beam report including the request to perform uplink sounding at the UE, where the one or more trigger conditions include a change in a quantity of antenna components of the UE per reference signal port satisfying a threshold, a quantity of slots prior to transmission of the beam report, or any combination thereof.

In some examples of the method, network entities, and non-transitory computer-readable medium described herein, the configuration indicates that, to transmit the beam report, the threshold for the change in the quantity of antenna elements of the UE may be satisfied within a quantity of slots before the UE may be scheduled to transmit the beam report including the request to perform uplink sounding at the UE.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

In some wireless communications systems, a user equipment (UE) may receive one or more reference signals from a network entity via one or more respective downlink beams using one or more antenna panels and may perform and report measurements for the received reference signals. The UE may report information associated with the received reference signals (e.g., the downlink beams) to the network entity via a beam report. In some examples, the antenna panels of the UE may be asymmetrical (e.g., physically, based on operation). That is, the antenna panels may each be associated with a different quantity of antenna elements and different antenna elements or panels may be utilized by different antenna ports. In such examples (e.g., for contention-based uplink), the UE may additionally include an indication of a sounding reference signal (SRS) port associated with each downlink beam indicated in the beam report. By doing so, the UE may update a panel port index for a corresponding uplink beam indicated by the beam report if the UE moves with asymmetrical antenna panels. However, the beam report may not consider a quantity of antenna elements per port of an antenna panel, which may provide reduced granularity of control for power saving, overheating, and flexibility of implementation with asymmetric antenna panels. Additionally, the beam report may not consider downlink spatial configuration adaption for asymmetric antenna panels.

Various aspects of the present disclosure are related to beam-based spatial adaption with asymmetric antenna panels. In some examples, a UE may receive reference signals from a network entity. The UE may perform measurements on the reference signals and report the measurements to the network entity via a beam report. In some examples, the beam report may indicate a request for updated uplink sounding at the UE, or may indicate a downlink rank associated with each beam indicated in the beam report. The UE may transmit the report based on a change in the quantity of antenna elements per port of the UE. In some examples, the UE may receive a configuration from the network entity indicating to transmit the report based on one or more trigger conditions, such as the change in the quantity of antenna elements satisfying a threshold. The network entity may schedule one or more SRSs to be transmitted by the UE in accordance with the request, and the UE may transmit the SRS in accordance with the scheduling.

Aspects of the disclosure are initially described in the context of wireless communications systems. Aspects of the disclosure are additionally illustrated with reference to process flows. Aspects of the disclosure are further illustrated by and described with reference to apparatus diagrams, system diagrams, and flowcharts that relate to beam-based spatial adaption with asymmetric antenna panels.

Figure 1:
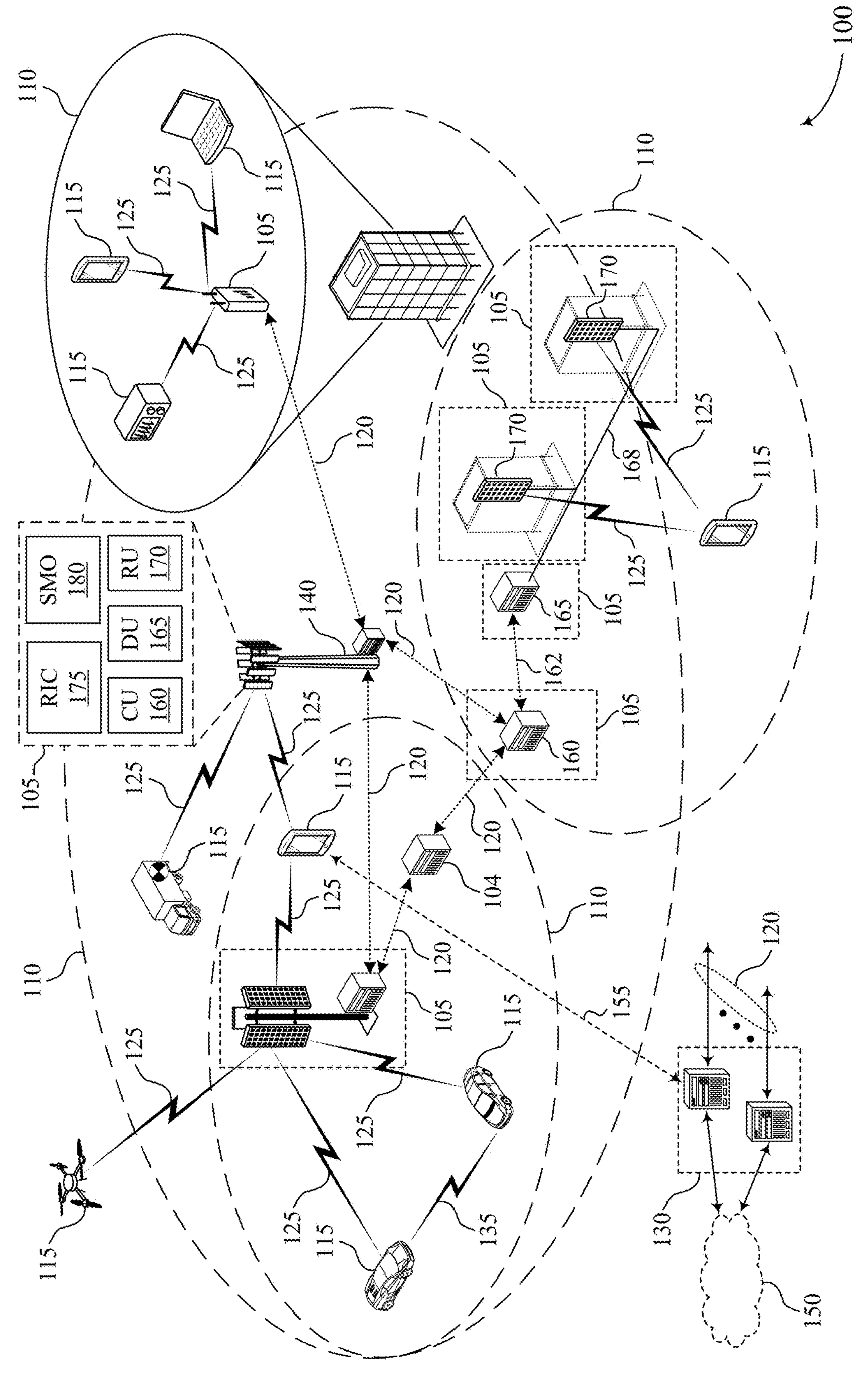
FIG. 1 shows an example of a wireless communications system that supports beam-based spatial adaption with asymmetric antenna panels in accordance with one or more aspects of the present disclosure.

FIG. 1 shows an example of a wireless communications system 100 that supports beam-based spatial adaption with asymmetric antenna panels in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, a UE 115 may receive one or more reference signals from a network entity 105 via one or more downlink beams. The UE 115 may perform measurements on the reference signals (e.g., the downlink beams) and report the measurements to the network entity 105 via a beam report. In some examples, the beam report may indicate a request for uplink sounding at the UE 115, or may indicate a downlink rank associated with each downlink beam indicated in the beam report. In some examples, the UE 115 may receive a configuration from the network entity 105 indicating to transmit the report based on one or more trigger conditions, such as a change in the quantity of antenna elements satisfying a threshold. The network entity 105 may schedule one or more SRS to be transmitted by the UE 115 in accordance with the request, and the UE 115 may transmit the SRS in accordance with the scheduling. The network entity may determine parameters for future communications between the network entity 105 and the UE 115 using the SRS, including a transmit precoding matrix indicator (TPMI).

Figure 2:
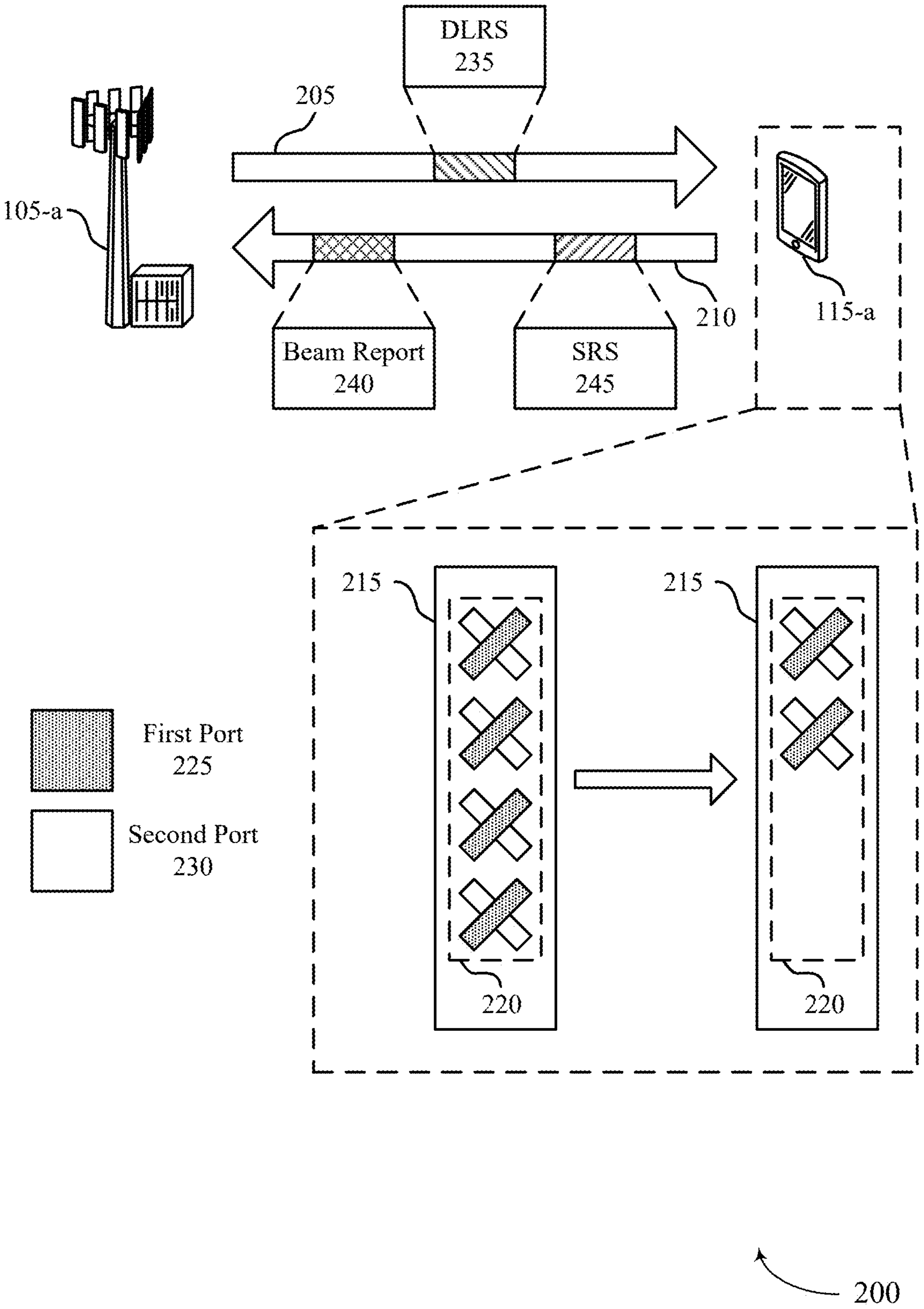
FIG. 2 shows an example of a wireless communications system that supports beam-based spatial adaption with asymmetric antenna panels in accordance with one or more aspects of the present disclosure.

FIG. 2 shows an example of a wireless communications system 200 that supports beam-based spatial adaption with asymmetric antenna panels in accordance with one or more aspects of the present disclosure. In some examples, the wireless communications system 200 may include a network entity 105-*a* and a UE 115-*a*, which may be examples of corresponding devices described herein, including with reference to FIG. 1. The network entity 105-*a* and the UE 115-*a* may communicate signaling via cellular communication links (e.g., 5G NR or beyond links). For example, the network entity 105-*a* may transmit signaling to the UE 115-*a* via a downlink 205 and may receive signaling from the UE 115-*a* via an uplink 210. Similarly, the UE 115-*a* may receive signaling from the network entity 105-*a* via the downlink 205 and may transmit signaling to the network entity 105-*a* via the uplink 210.

The UE 115-*a* may include a plurality of antenna panels 215, where each antenna panel 215 may include a quantity of antenna elements 220. The UE 115-*a* may communicate using the plurality of antenna panels 215 over one or more frequency bands (e.g., an FR2 band, an FR3 band). In some examples, each antenna panel 215 may include multiple ports (e.g., antenna ports), such as a first port 225 and a second port 230. The quantity of antenna elements 220 may be shared between the multiple ports. That is, there may be a first quantity of the antenna elements 220 associated with the first port 225, and there may be a second quantity of the antenna elements 220 associated with the second port 230.

In some examples, the antenna panels 215 of the UE 115-*a* may be asymmetrical (e.g., may not be symmetrical). For example, an antenna panel 215 of the UE 115-*a* facing a first direction (e.g., left) may have a different quantity of antenna elements 220 compared to another antenna panel 215 of the UE 115-*a* facing a second direction opposite to the first direction (e.g., right). Alternatively, the antenna panels 215 may include a same quantity of antenna elements 220 but may become asymmetrical during operation. For example, a hand position of a user of the UE 115-*a* may obstruct (e.g., block) one or more antenna elements 220 of an antenna panel 215 facing the first direction while leaving one or more antenna elements 220 of another antenna panel 215 facing the second direction unobstructed.

In some examples, the network entity 105-*a* and the UE 115-*a* may communicate reference signals to determine parameters for communications between the network entity 105-*a* and the UE 115-*a*. For example, the network entity 105-*a* may transmit a downlink reference signal (DLRS) 235 to the UE 115-*a*. In some cases, the network entity 105-*a* may transmit multiple DLRS 235 to the UE 115-*a*. The UE 115-*a* may receive the DLRS 235 and perform measurements (e.g., signal strength measurements) on the DLRS 235. The UE 115-*a* may transmit a beam report 240 (e.g., a Layer 1 (L1) beam report) to the network entity 105-*a* indicating the measurements. If the network entity 105-*a* transmits multiple DLRS 235 to the UE 115-*a*, the beam report 240 may include measurements for each DLRS 235 received by the UE 115-*a*.

In addition to reporting measurements for each DLRS 235, the UE 115-*a* may report one or more port numbers (e.g., port indices) of the UE 115-*a* for transmitting one or more respective SRS 245. A reporting quantity of the beam report 240 may indicate that the beam report 240 includes the one or more port numbers. For example, the reporting quantity may be set to cri-RSRP-Index, ssb-RSRP-Index, cri-SINR-Index, or ssb-Index-SINR-Index. The reporting quantity may correspond to a capability (e.g., a capability set value) of the UE 115-*a* indicating a quantity of ports that support transmitting SRS 245.

The UE 115-*a* may transmit the SRS 245 as a part of a contention-based communications between the UE 115-*a* and the network entity 105-*a*. If the UE 115-*a* has asymmetric antenna panels 215 and moves (e.g., rotates), the UE 115-*a* may update a port index for transmitting an uplink beam indicated in the beam report. The network entity 105-*a* may schedule resources for transmitting the SRS 245 corresponding to the port index indicated in the report. The UE 115-*a* may transmit the SRS 245 to the network entity 105-*a* as part of an uplink sounding procedure, and the network entity 105-*a* may determine a TPMI for communications between the network entity 105-*a* and the UE 115-*a*.

In some examples, the UE 115-*a* may indicate a request to perform uplink sounding via the beam report 240. In some examples, the UE 115-*a* may indicate the request via an enhanced beam report 240. For example, the UE 115-*a* may indicate the request via a reporting quantity of the beam report 240 that is dedicated to indicating the request. The UE 115-*a* may indicate the request based on a capability of the UE. For example, the UE 115-*a* may indicate the request if the UE 115-*a* supports communications using multiple antenna panels 215. Alternatively, the UE 115-*a* may indicate the request based on indicating (e.g., to the network entity 105-*a*) that the UE 115-*a* supports indicating the request via the beam report 240. The UE 115-*a* may transmit the beam report via control signaling, such as via uplink control information (UCI) or via a medium access control-control element (MAC-CE). The control signaling may include one or more reserved bits, one or more padding bits, or the reporting quantity, for indicating the request to the network entity 105-*a*.

The UE 115-*a* may indicate the request in the beam report 240 in accordance with one or more trigger conditions. For example, a quantity of antenna elements 220 associated with an SRS port (e.g., the first port 225, the second port 230, or both) may change. The network entity 105-*a* may configure the UE 115-*a* to indicate the request if the change in the quantity of antenna elements 220 satisfies a threshold value. Additionally, the network entity 105-*a* may configure the UE 115-*a* to indicate the request if the change in the quantity of antenna elements 220 occurs within a quantity of slots (e.g., within N slots) before the UE 115-*a* is scheduled to transmit the beam report 240. Alternatively, in some cases the UE 115-*a* may indicate the request if the quantity of antenna elements 220 per SRS port is the same (e.g., does not change, change does not exceed the threshold value). For example, the UE 115-*a* may indicate the request via a bit (e.g., a single bit) of the beam report 240. The UE 115-*a* may indicate the request in accordance with the capability of the UE 115-*a*.

The network entity may receive the beam report 240 and may trigger uplink sounding for the UE 115-*a* based on the beam report. For example, if the beam report indicates a change in the quantity of antenna elements per SRS port (e.g., the first port 225, the second port 230), or if a bit of the beam report 240 indicates a request for uplink sounding, the network entity 105-*a* may schedule the one or more SRS 245. The network entity 105-*a* may schedule the one or more SRS 245 within a quantity of symbols (e.g., within X symbols) after receiving the beam report 240.

In some examples, the UE 115-*a* may predict a future change in the quantity of antenna elements 220 of an SRS port (e.g., the first port 225, the second port 230). The UE 115-*a* may implement a learning model (e.g., a machine learning model) to predict the change in the quantity of antenna elements. In such examples, the single bit indicating the request may behave like a scheduling request. The single bit may indicate a prediction confidence associated with the learning model, may indicate a sounding pattern for future communications between the UE 115-*a* and the network entity 105-*a* requested by the UE 115-*a*.

Figure 3:
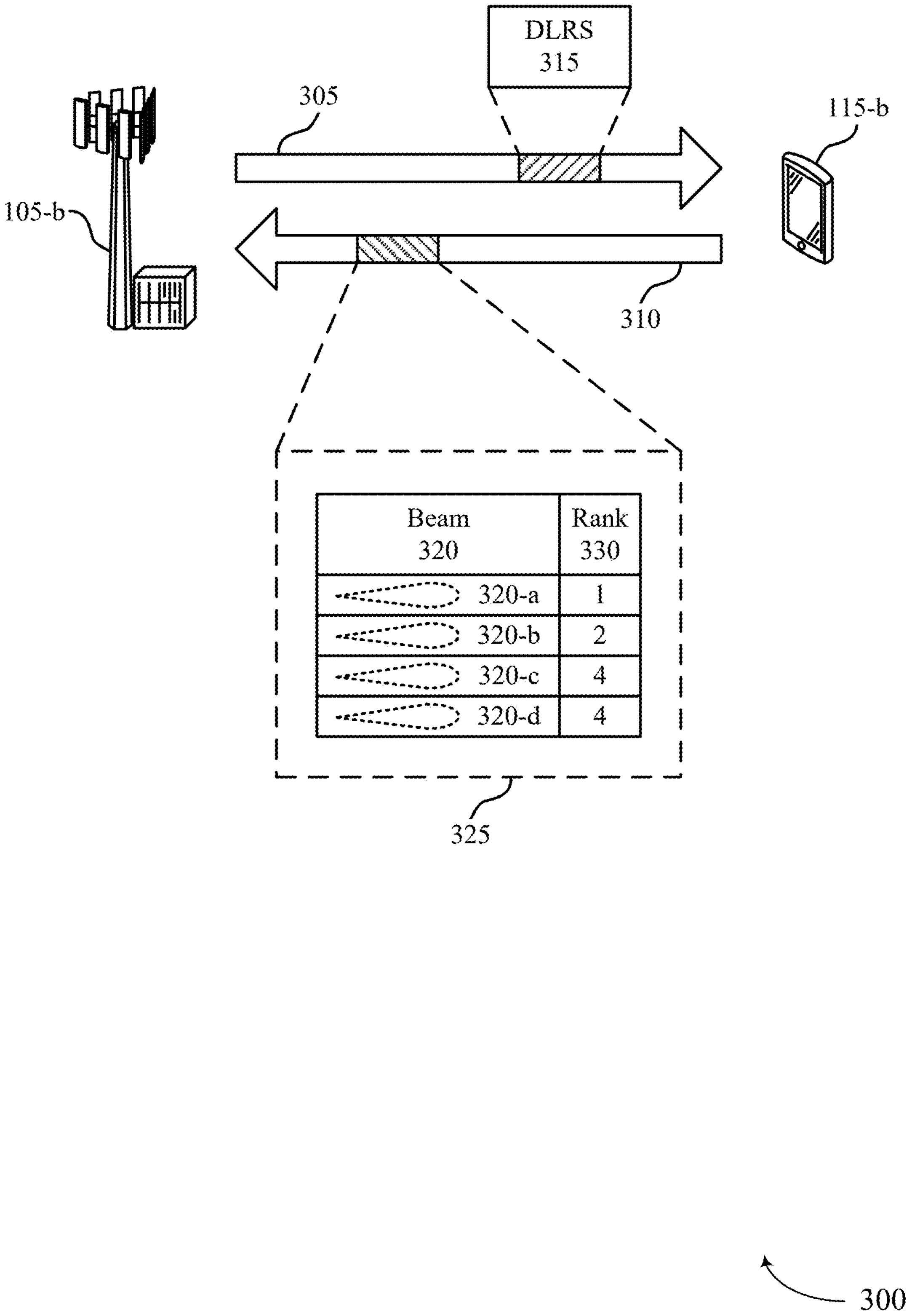
FIG. 3 shows an example of a wireless communications system that supports beam-based spatial adaption with asymmetric antenna panels in accordance with one or more aspects of the present disclosure.

FIG. 3 shows an example of a wireless communications system 300 that supports beam-based spatial adaption with asymmetric antenna panels in accordance with one or more aspects of the present disclosure. In some examples, the wireless communications system 200 may include a network entity 105-*b* and a UE 115-*b*, which may be examples of corresponding devices described herein, including with reference to FIG. 1. The network entity 105-*b* and the UE 115-*b* may communicate signaling via cellular communication links (e.g., 5G NR links). For example, the network entity 105-*b* may transmit signaling to the UE 115-*b* via a downlink 305 and may receive signaling from the UE 115-*b* via an uplink 310. Similarly, the UE 115-*b* may receive signaling from the network entity 105-*b* via the downlink 305 and may transmit signaling to the network entity 105-*b* via the uplink 310.

As described herein with reference to FIG. 2, the network entity 105-*b* and the UE 115-*b* may communicate reference signals, including one or more DLRS 315. For example, the network entity 105-*b* may transmit the one or more DLRS 315 via one or more respective beams 320 to the UE 115-*b*. In the example of FIG. 3, the UE 115-*b* may receive DLRS 315 via a first beam 320-*a*, a second beam 320-*b*, a third beam 320-*c*, and a fourth beam 320-*d*. The UE 115-*b* may receive the DLRS 315 and perform measurements (e.g., signal strength measurements) on the DLRS 315. The UE 115-*b* may transmit a beam report 325 (e.g., a Layer 1 (L1) beam report) to the network entity 105-*b* indicating the measurements for each DLRS 315 received by the UE 115-*b*.

In some examples, the UE 115-*b* may indicate a rank 330 (e.g., a downlink rank) associated with each received DLRS 315 in the beam report 325. For example, the UE 115-*b* may indicate a rank 330 for each beam 320 carrying a DLRS 315 that is received by an antenna panel of the UE 115-*b*. The UE 115-*b* may indicate the ranks 330 via a plurality of bits of the beam report 325. For example, the UE 115-*b* may use two bits of the beam report 325 to indicate a downlink rank of 1, 2, or 4 for a beam 320. In the example of FIG. 3, the first beam 320-*a* may be associated with a rank 330 of 1, the second beam 320-*b* may be associated with a rank 330 of 2, and both the third beam 320-*c* and the fourth beam 320-*d* may be associated with a rank 330 of 4. The UE 115-*b* may include the ranks 330 to assist with spatial domain adaptation for uplink and downlink communications based on traffic demands associated with uplink communications, downlink communications, or both.

In some examples, the beam report 325 may separately indicate information associated with downlink communications and information associated with uplink communications. For example, the UE 115-*b* may configure the beam report 325 such that the plurality of bits indicating the ranks 330 may be separate from any indications of SRS ports for uplink transmissions included in the beam report 325. That is, the UE 115-*b* may indicate the ranks using a reporting quantity different from a reporting quantity used to indicate SRS ports for uplink transmissions by the UE 115-*b*.

Figure 4:
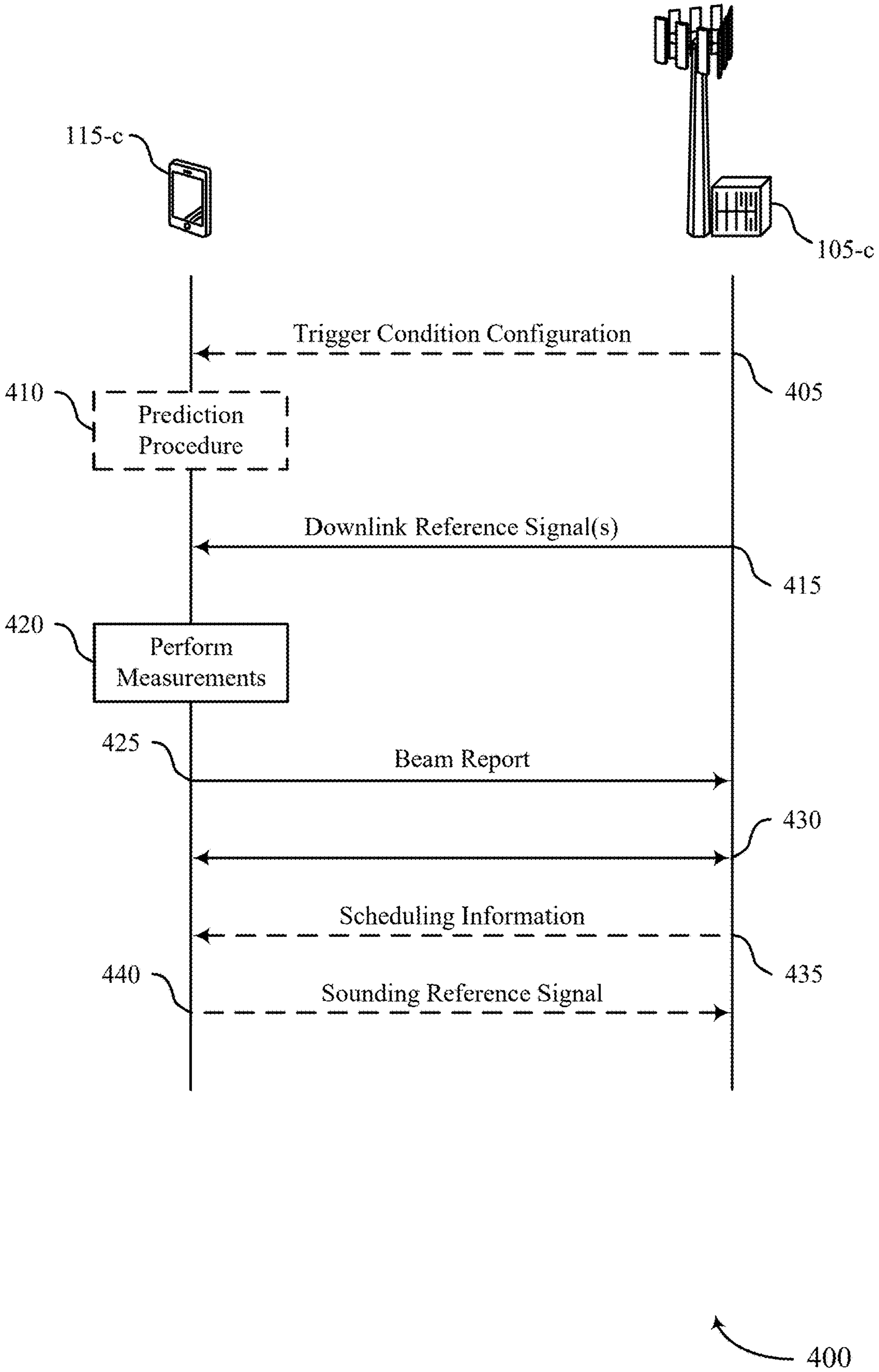
FIG. 4 shows an example of a process flow that supports beam-based spatial adaption with asymmetric antenna panels in accordance with one or more aspects of the present disclosure.

FIG. 4 shows an example of a process flow 400 that supports beam-based spatial adaption with asymmetric antenna panels in accordance with one or more aspects of the present disclosure. The process flow 400 may implement or be implemented by aspects of the wireless communications system 100, the wireless communications system 200, and the wireless communications system 300, as described with reference to FIGS. 1, 2, and 3. For example, the process flow 400 illustrates actions performed by a network entity 105-*c* and a UE 115-*c*, which may be examples of corresponding devices described herein, including with reference to FIGS. 1-3. In the following description of the process flow 400, the operations between the network entity 105-*c* and the UE 115-*c* may be performed in a different order than the example shown, or the operations between the network entity 105-*c* and the UE 115-*c* may be performed in different orders at different times. Some operations may also be omitted from the process flow 400, and other operations may be added to the process flow 400.

At 405, the network entity 105-*c* may output, to the UE 115-*c*, an indication of a configuration of one or more trigger conditions for the UE 115-*c*. Satisfaction of the one or more trigger conditions may trigger the UE 115-*c* to transmit a beam report comprising a request to perform uplink sounding at the UE 115-*c*. The one or more trigger conditions may comprise a change in a quantity of antenna components of the UE 115-*c* per reference signal port satisfying a threshold, a quantity of slots prior to transmission of the beam report, or any combination thereof. In some examples, the configuration may indicate that, to transmit the beam report, the threshold for the change in the quantity of antenna elements of the UE 115-*c* is satisfied within a quantity of slots before the UE 115-*c* is scheduled to transmit the beam report comprising the request to perform uplink sounding at the UE 115-*c*.

At 410, the UE 115-*c* may perform a prediction procedure using a machine learning model to predict a change in a quantity of antenna components of the UE 115-*c*. The UE 115-*c* may transmit the beam report comprising the request to perform uplink sounding at the UE based at least in part on predicting the change in the quantity of antenna components of the UE 115-*c*. The UE 115-*c* may also transmit a prediction confidence or a sounding pattern associated with uplink sounding at the UE 115-*c* to the network entity 105-*c* based at least in part on performing the prediction procedure.

At 415, the network entity 105-*c* may output, to the UE 115-*c*, one or more DLRS via one or more receive beams of the UE 115-*c*. At 420, the UE 115-*c* may perform one or more measurements of the one or more DLRS transmitted by the network entity 105-*c*. At 425, the UE 115-*c* may transmit the beam report based at least in part on a capability of the UE and on the one or more measurements of the one or more DLRS. The beam report may comprise the request to perform uplink sounding at the UE or may comprise one or more respective downlink rank indicators associated with respective beams of the one or more receive beams. In some examples, the UE 115-*c* may transmit the beam report comprising the request to perform uplink sounding at the UE 115-*c* based at least in part on a change in the quantity of antenna components of the UE 115-*c* per reference signal port. The UE 115-*c* may transmit the request to perform uplink sounding at the UE via UCI signaling or a MAC-CE.

In some examples, the UE 115-*c* may transmit a reporting quantity dedicated for the request to perform uplink sounding at the UE 115-*c* or for the one or more respective downlink rank indicators based at least in part on a capability of the UE to support uplink communications using multiple antenna panels. In some cases, the UE 115-*c* may transmit a single bit indicating the request to perform uplink sounding at the UE 115-*c*. Additionally, or alternatively, the UE 115-*c* may transmit a plurality of bits indicating the one or more respective downlink rank indicators associated with the respective beams of the one or more receive beams.

At 430, the network entity 105-*c* may communicate one or more signals with the UE based at least in part on the beam report. For example, at 435, the network entity 105-*c* may output scheduling information for one or more subsequent downlink messages from the network entity 105-*c* based at least in part on the one or more respective downlink rank indicators. Additionally, or alternatively, the network entity 105-*c* may output scheduling information for an SRS based at least in part on the beam report comprising the request to perform uplink sounding at the UE 115-*c*. The network entity 105-*c* may schedule the SRS within a quantity of symbols after reception of the beam report.

At 440, the UE 115-*c* may transmit the SRS based at least in part on the beam report comprising the request to perform uplink sounding at the UE 115-*c*. The SRS may be scheduled within a quantity of symbols after transmission of the beam report. The network entity may determine one or more parameters for communications between the network entity 105-*c* and the UE 115-*c*, including a TPMI.

Figure 5:
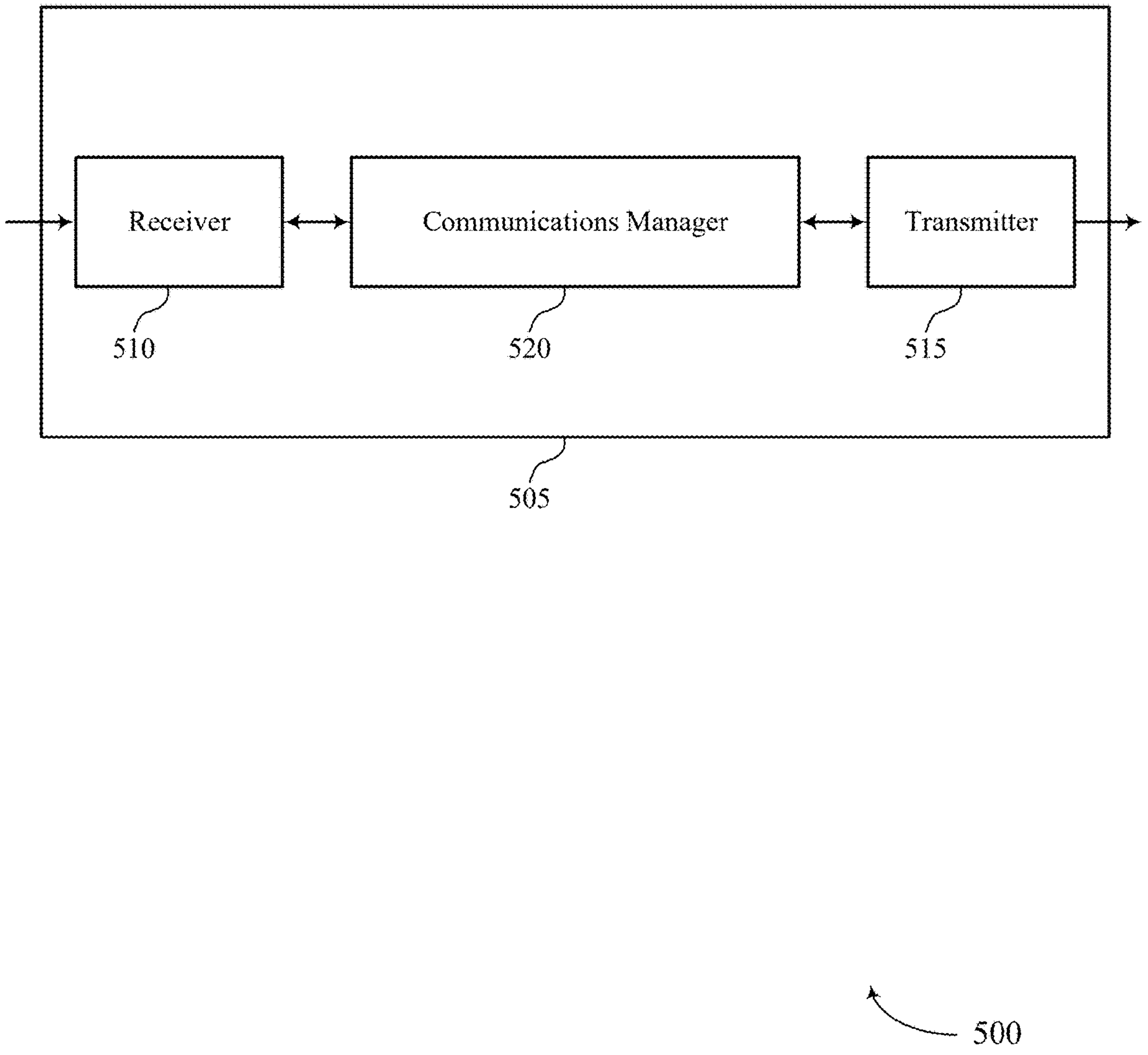
FIGS. 5 and 6 show block diagrams of devices that support beam-based spatial adaption with asymmetric antenna panels in accordance with one or more aspects of the present disclosure.

FIG. 5 shows a block diagram 500 of a device 505 that supports beam-based spatial adaption with asymmetric antenna panels in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to beam-based spatial adaption with asymmetric antenna panels). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam-based spatial adaption with asymmetric antenna panels). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of beam-based spatial adaption with asymmetric antenna panels as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, a graphics processing unit (GPU), a neural processing unit (NPU), an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving, from a network entity, one or more DLRS via one or more receive beams of the UE. The communications manager 520 is capable of, configured to, or operable to support a means for performing one or more measurements of the one or more DLRS. The communications manager 520 is capable of, configured to, or operable to support a means for transmitting a beam report based on a capability of the UE and on the one or more measurements of the one or more DLRS, the beam report including a request to perform uplink sounding at the UE or including one or more respective downlink rank indicators associated with respective beams of the one or more receive beams.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for more efficient utilization of communication resources.

Figure 6:
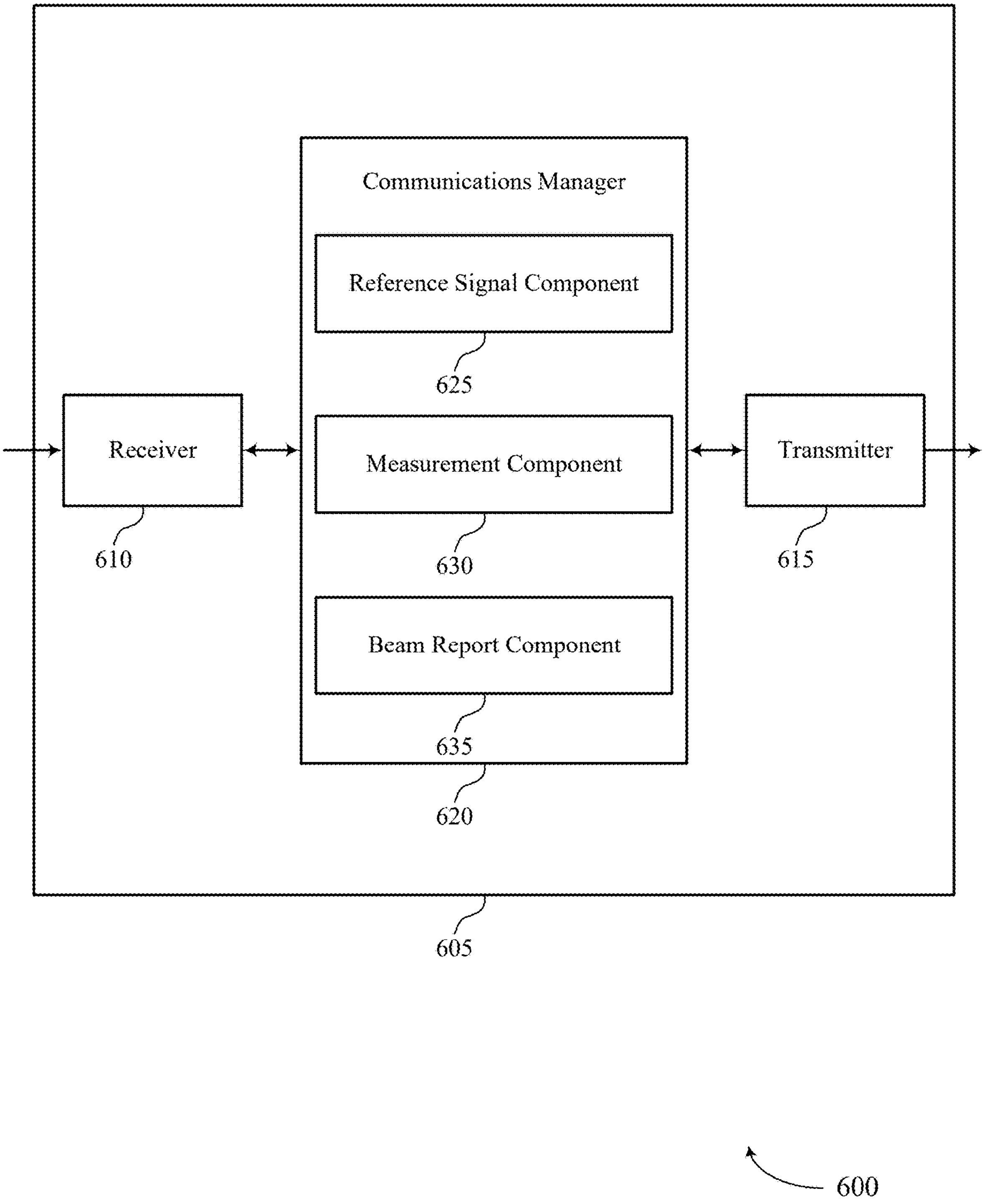

FIG. 6 shows a block diagram 600 of a device 605 that supports beam-based spatial adaption with asymmetric antenna panels in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to beam-based spatial adaption with asymmetric antenna panels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam-based spatial adaption with asymmetric antenna panels). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of beam-based spatial adaption with asymmetric antenna panels as described herein. For example, the communications manager 620 may include a reference signal component 625, a measurement component 630, a beam report component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The reference signal component 625 is capable of, configured to, or operable to support a means for receiving, from a network entity, one or more DLRS via one or more receive beams of the UE. The measurement component 630 is capable of, configured to, or operable to support a means for performing one or more measurements of the one or more DLRS. The beam report component 635 is capable of, configured to, or operable to support a means for transmitting a beam report based on a capability of the UE and on the one or more measurements of the one or more DLRS, the beam report including a request to perform uplink sounding at the UE or including one or more respective downlink rank indicators associated with respective beams of the one or more receive beams.

Figure 7:
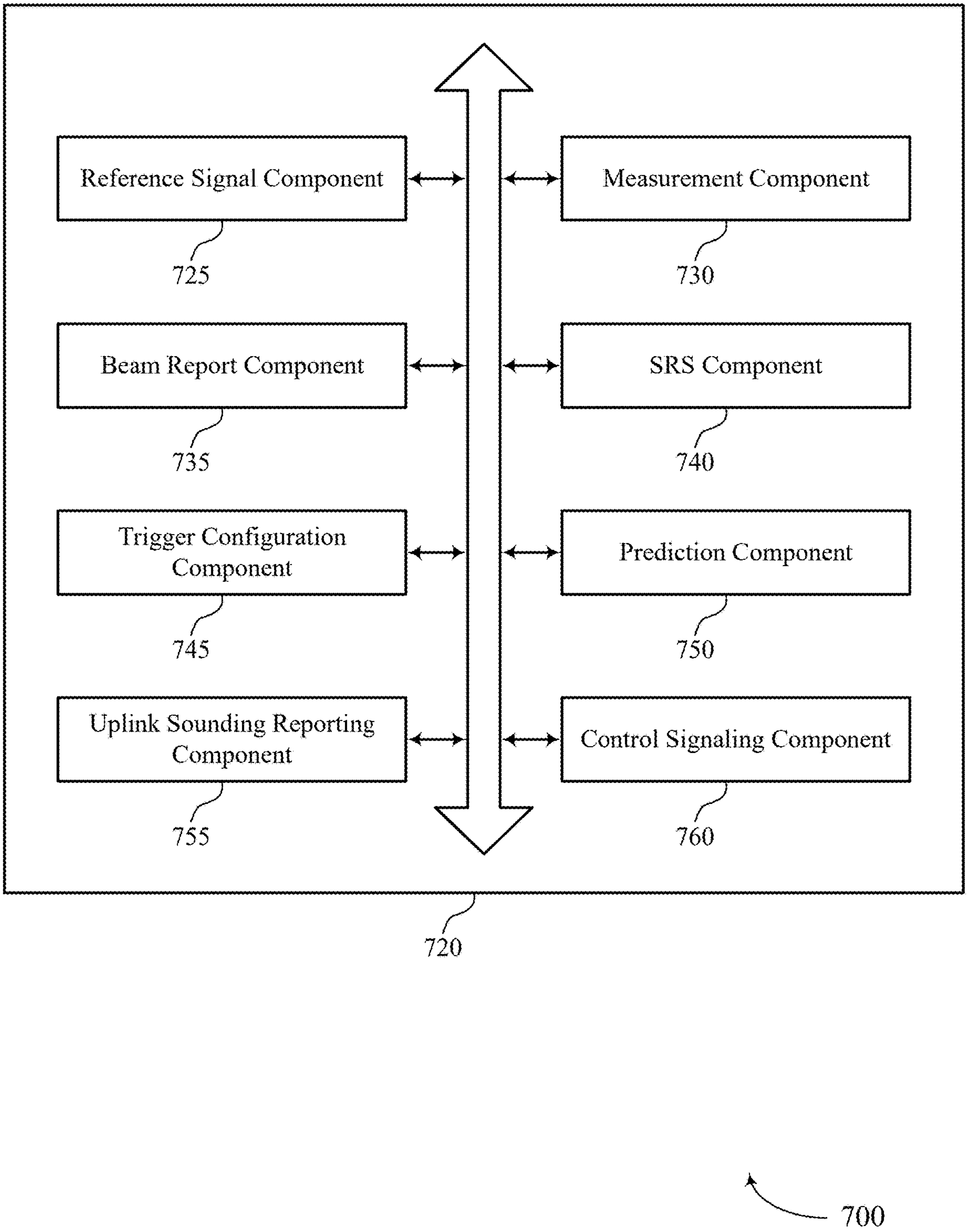
FIG. 7 shows a block diagram of a communications manager that supports beam-based spatial adaption with asymmetric antenna panels in accordance with one or more aspects of the present disclosure.

FIG. 7 shows a block diagram 700 of a communications manager 720 that supports beam-based spatial adaption with asymmetric antenna panels in accordance with one or more aspects of the present disclosure. The communications manager 720 may be an example of aspects of a communications manager 520, a communications manager 620, or both, as described herein. The communications manager 720, or various components thereof, may be an example of means for performing various aspects of beam-based spatial adaption with asymmetric antenna panels as described herein. For example, the communications manager 720 may include a reference signal component 725, a measurement component 730, a beam report component 735, an SRS component 740, a trigger configuration component 745, a prediction component 750, an uplink sounding reporting component 755, a control signaling component 760, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The reference signal component 725 is capable of, configured to, or operable to support a means for receiving, from a network entity, one or more DLRS via one or more receive beams of the UE. The measurement component 730 is capable of, configured to, or operable to support a means for performing one or more measurements of the one or more DLRS. The beam report component 735 is capable of, configured to, or operable to support a means for transmitting a beam report based on a capability of the UE and on the one or more measurements of the one or more DLRS, the beam report including a request to perform uplink sounding at the UE or including one or more respective downlink rank indicators associated with respective beams of the one or more receive beams.

In some examples, to support transmitting the beam report, the beam report component 735 is capable of, configured to, or operable to support a means for transmitting the beam report including the request to perform uplink sounding at the UE based on a change in a quantity of antenna components of the UE per reference signal port.

In some examples, the SRS component 740 is capable of, configured to, or operable to support a means for transmitting an SRS based on the beam report including the request to perform uplink sounding at the UE, where the SRS is scheduled within a quantity of symbols after transmission of the beam report.

In some examples, the trigger configuration component 745 is capable of, configured to, or operable to support a means for receiving, from the network entity, an indication of a configuration of one or more trigger conditions for the UE, where satisfaction of the one or more trigger conditions triggers the UE to transmit the beam report including the request to perform uplink sounding at the UE, where the one or more trigger conditions include a change in a quantity of antenna components of the UE per reference signal port satisfying a threshold, a quantity of slots prior to transmission of the beam report, or any combination thereof.

In some examples, the configuration indicates that, to transmit the beam report, the threshold for the change in the quantity of antenna components of the UE is satisfied within a quantity of slots before the UE is scheduled to transmit the beam report including the request to perform uplink sounding at the UE.

In some examples, to support transmitting the beam report, the beam report component 735 is capable of, configured to, or operable to support a means for transmitting a reporting quantity dedicated for the request to perform uplink sounding at the UE or for the one or more respective downlink rank indicators based on a capability of the UE to support uplink communications using multiple antenna panels.

In some examples, to support transmitting the beam report, the beam report component 735 is capable of, configured to, or operable to support a means for transmitting a single bit indicating the request to perform uplink sounding at the UE.

In some examples, to support transmitting the beam report, the beam report component 735 is capable of, configured to, or operable to support a means for transmitting a set of multiple bits indicating the one or more respective downlink rank indicators associated with the respective beams of the one or more receive beams.

In some examples, the prediction component 750 is capable of, configured to, or operable to support a means for performing a prediction procedure using a machine learning model to predict a change in a quantity of antenna components of the UE. In some examples, the beam report component 735 is capable of, configured to, or operable to support a means for transmitting the beam report including the request to perform uplink sounding at the UE based on predicting the change in the quantity of antenna components of the UE.

In some examples, the uplink sounding reporting component 755 is capable of, configured to, or operable to support a means for transmitting a prediction confidence or a sounding pattern associated with uplink sounding at the UE to the network entity.

In some examples, the control signaling component 760 is capable of, configured to, or operable to support a means for transmitting the request to perform uplink sounding at the UE via UCI signaling or a MAC-CE.

Figure 8:
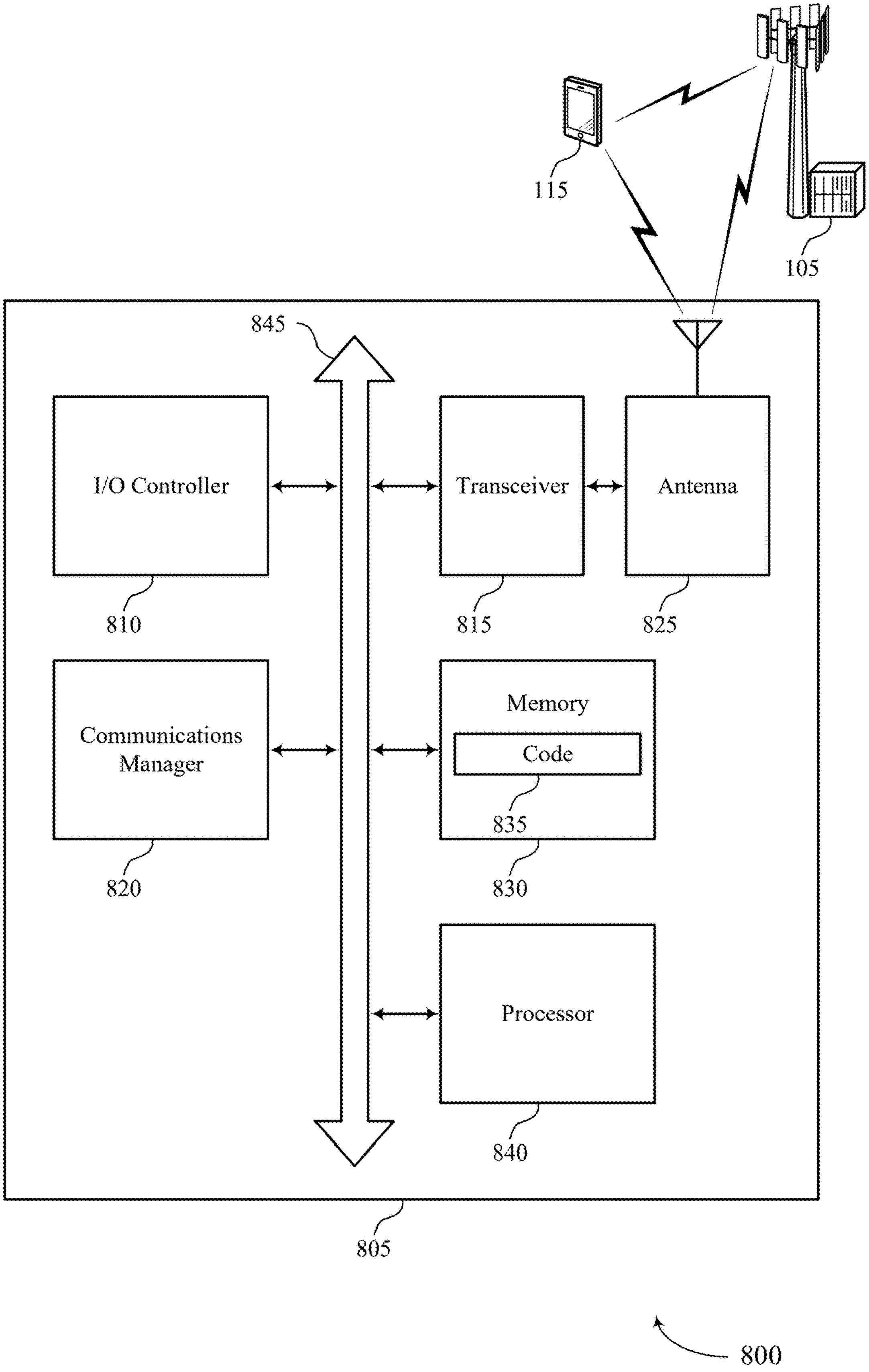
FIG. 8 shows a diagram of a system including a device that supports beam-based spatial adaption with asymmetric antenna panels in accordance with one or more aspects of the present disclosure.

FIG. 8 shows a diagram of a system 800 including a device 805 that supports beam-based spatial adaption with asymmetric antenna panels in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more GPUs, one or more NPUs (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting beam-based spatial adaption with asymmetric antenna panels). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving, from a network entity, one or more DLRS via one or more receive beams of the UE. The communications manager 820 is capable of, configured to, or operable to support a means for performing one or more measurements of the one or more DLRS. The communications manager 820 is capable of, configured to, or operable to support a means for transmitting a beam report based on a capability of the UE and on the one or more measurements of the one or more DLRS, the beam report including a request to perform uplink sounding at the UE or including one or more respective downlink rank indicators associated with respective beams of the one or more receive beams.

By including or configuring the communications manager 820 in accordance with examples as described herein, the device 805 may support techniques for improved user experience related to more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of beam-based spatial adaption with asymmetric antenna panels as described herein, or the at least one processor 840 and the at least one memory 830 may be otherwise configured to, individually or collectively, perform or support such operations.

Figure 9:
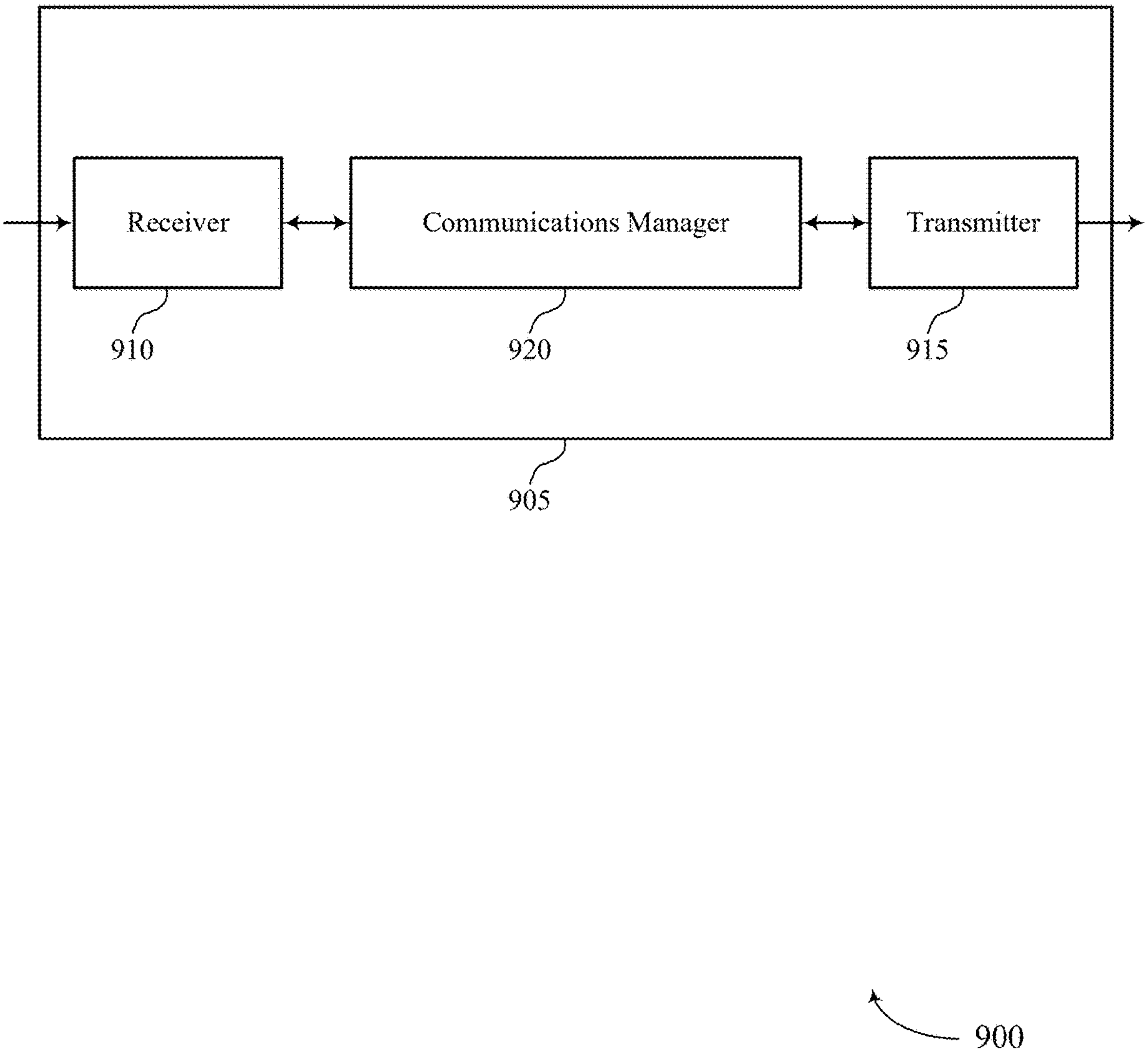
FIGS. 9 and 10 show block diagrams of devices that support beam-based spatial adaption with asymmetric antenna panels in accordance with one or more aspects of the present disclosure.

FIG. 9 shows a block diagram 900 of a device 905 that supports beam-based spatial adaption with asymmetric antenna panels in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of beam-based spatial adaption with asymmetric antenna panels as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, a GPU, a DSP, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for outputting, to a UE, one or more DLRS via one or more receive beams of the UE. The communications manager 920 is capable of, configured to, or operable to support a means for obtaining a beam report including a request to perform uplink sounding at the UE or including one or more respective downlink rank indicators associated with respective beams of the one or more receive beams. The communications manager 920 is capable of, configured to, or operable to support a means for communicating one or more signals with the UE based on the beam report.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for more efficient utilization of communication resources.

Figure 10:
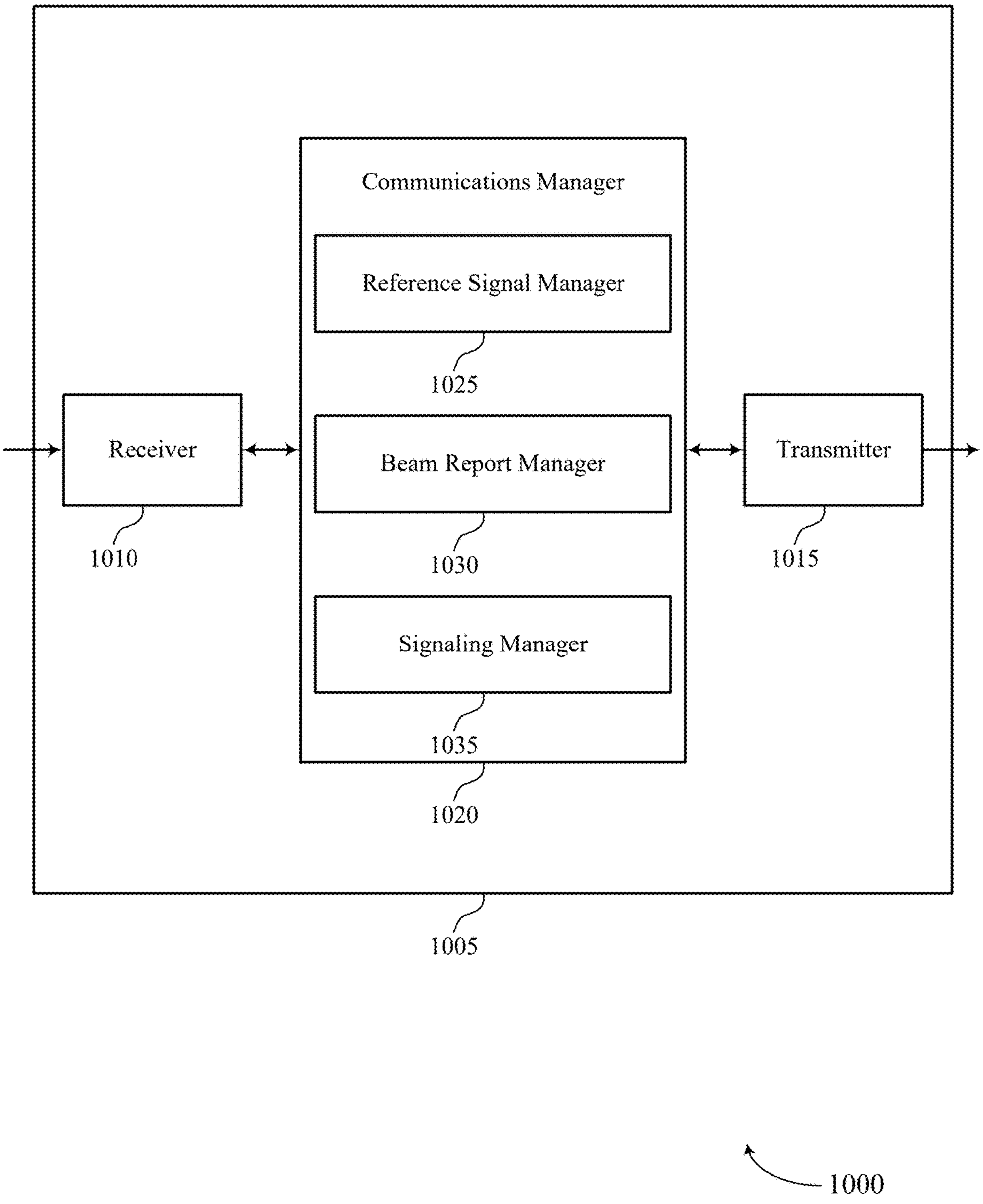

FIG. 10 shows a block diagram 1000 of a device 1005 that supports beam-based spatial adaption with asymmetric antenna panels in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of beam-based spatial adaption with asymmetric antenna panels as described herein. For example, the communications manager 1020 may include a reference signal manager 1025, a beam report manager 1030, a signaling manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The reference signal manager 1025 is capable of, configured to, or operable to support a means for outputting, to a UE, one or more DLRS via one or more receive beams of the UE. The beam report manager 1030 is capable of, configured to, or operable to support a means for obtaining a beam report including a request to perform uplink sounding at the UE or including one or more respective downlink rank indicators associated with respective beams of the one or more receive beams. The signaling manager 1035 is capable of, configured to, or operable to support a means for communicating one or more signals with the UE based on the beam report.

Figure 11:
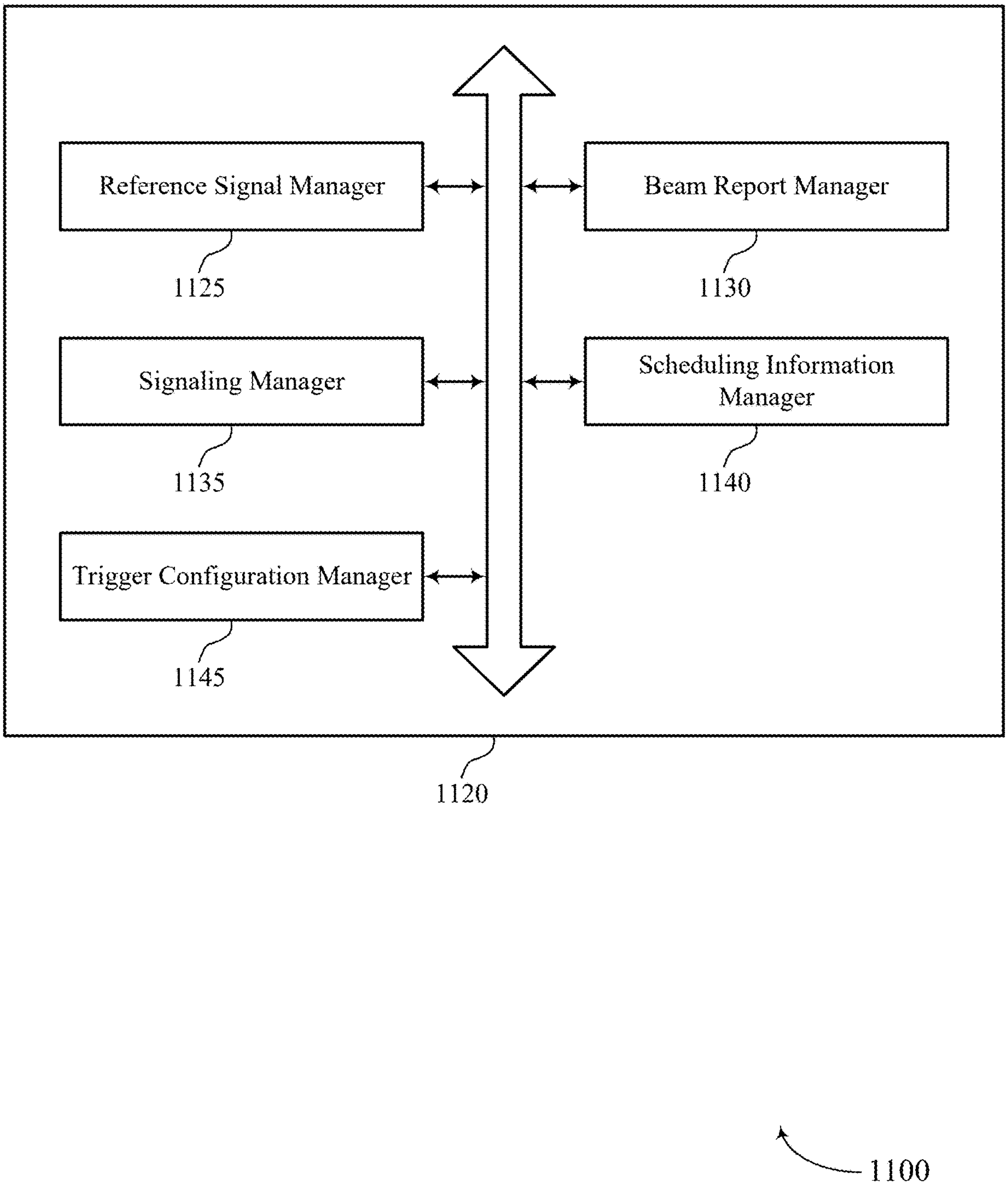
FIG. 11 shows a block diagram of a communications manager that supports beam-based spatial adaption with asymmetric antenna panels in accordance with one or more aspects of the present disclosure.

FIG. 11 shows a block diagram 1100 of a communications manager 1120 that supports beam-based spatial adaption with asymmetric antenna panels in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of beam-based spatial adaption with asymmetric antenna panels as described herein. For example, the communications manager 1120 may include a reference signal manager 1125, a beam report manager 1130, a signaling manager 1135, a scheduling information manager 1140, a trigger configuration manager 1145, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The reference signal manager 1125 is capable of, configured to, or operable to support a means for outputting, to a UE, one or more DLRS via one or more receive beams of the UE. The beam report manager 1130 is capable of, configured to, or operable to support a means for obtaining a beam report including a request to perform uplink sounding at the UE or including one or more respective downlink rank indicators associated with respective beams of the one or more receive beams. The signaling manager 1135 is capable of, configured to, or operable to support a means for communicating one or more signals with the UE based on the beam report.

In some examples, to support communicating the one or more signals, the scheduling information manager 1140 is capable of, configured to, or operable to support a means for outputting scheduling information for one or more subsequent downlink messages from the network entity based on the one or more respective downlink rank indicators.

In some examples, to support communicating the one or more signals, the scheduling information manager 1140 is capable of, configured to, or operable to support a means for outputting scheduling information for an SRS based on the beam report including the request to perform uplink sounding at the UE, where the network entity schedules the SRS within a quantity of symbols after reception of beam report.

In some examples, the trigger configuration manager 1145 is capable of, configured to, or operable to support a means for outputting, to the UE, an indication of a configuration of one or more trigger conditions for the UE, where satisfaction of the one or more trigger conditions triggers the UE to transmit the beam report including the request to perform uplink sounding at the UE, where the one or more trigger conditions include a change in a quantity of antenna components of the UE per reference signal port satisfying a threshold, a quantity of slots prior to transmission of the beam report, or any combination thereof.

In some examples, the configuration indicates that, to transmit the beam report, the threshold for the change in the quantity of antenna elements of the UE is satisfied within a quantity of slots before the UE is scheduled to transmit the beam report including the request to perform uplink sounding at the UE.

Figure 12:
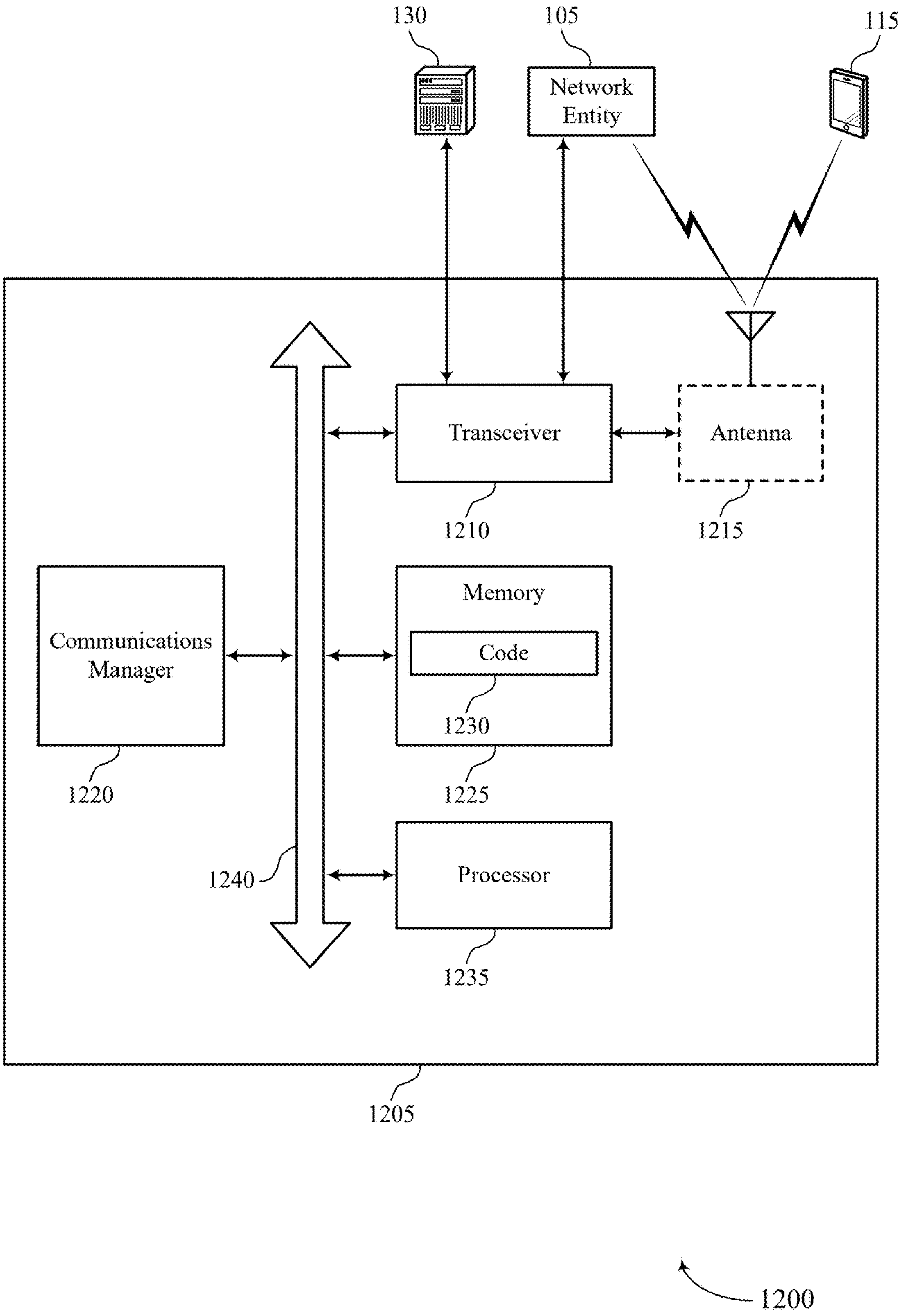
FIG. 12 shows a diagram of a system including a device that supports beam-based spatial adaption with asymmetric antenna panels in accordance with one or more aspects of the present disclosure.

FIG. 12 shows a diagram of a system 1200 including a device 1205 that supports beam-based spatial adaption with asymmetric antenna panels in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more CPUs, one or more GPUs, one or more NPUs (also referred to as neural network processors or DLPs), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting beam-based spatial adaption with asymmetric antenna panels). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225).

In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for outputting, to a UE, one or more DLRS via one or more receive beams of the UE. The communications manager 1220 is capable of, configured to, or operable to support a means for obtaining a beam report including a request to perform uplink sounding at the UE or including one or more respective downlink rank indicators associated with respective beams of the one or more receive beams. The communications manager 1220 is capable of, configured to, or operable to support a means for communicating one or more signals with the UE based on the beam report.

By including or configuring the communications manager 1220 in accordance with examples as described herein, the device 1205 may support techniques for improved user experience related to more efficient utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of beam-based spatial adaption with asymmetric antenna panels as described herein, or the at least one processor 1235 and the at least one memory 1225 may be otherwise configured to, individually or collectively, perform or support such operations.

Figure 13:
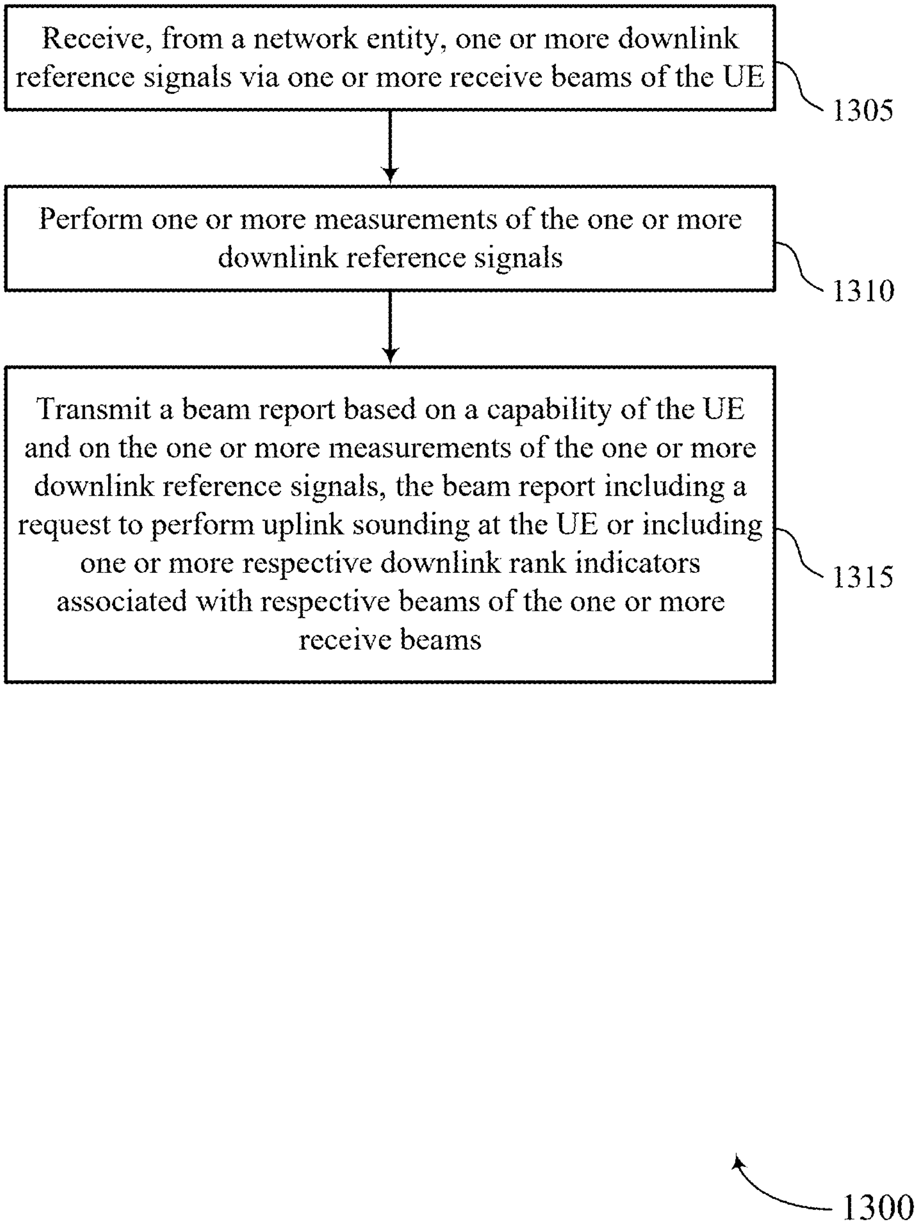
FIGS. 13 and 14 show flowcharts illustrating methods that support beam-based spatial adaption with asymmetric antenna panels in accordance with one or more aspects of the present disclosure.

FIG. 13 shows a flowchart illustrating a method 1300 that supports beam-based spatial adaption with asymmetric antenna panels in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, one or more DLRS via one or more receive beams of the UE. The operations of 1305 may be performed in accordance with examples as disclosed herein. In some examples, aspects of the operations of 1305 may be performed by a reference signal component 725 as described with reference to FIG. 7.

At 1310, the method may include performing one or more measurements of the one or more DLRS. The operations of 1310 may be performed in accordance with examples as disclosed herein. In some examples, aspects of the operations of 1310 may be performed by a measurement component 730 as described with reference to FIG. 7.

At 1315, the method may include transmitting a beam report based on a capability of the UE and on the one or more measurements of the one or more DLRS, the beam report including a request to perform uplink sounding at the UE or including one or more respective downlink rank indicators associated with respective beams of the one or more receive beams. The operations of 1315 may be performed in accordance with examples as disclosed herein. In some examples, aspects of the operations of 1315 may be performed by a beam report component 735 as described with reference to FIG. 7.

Figure 14:
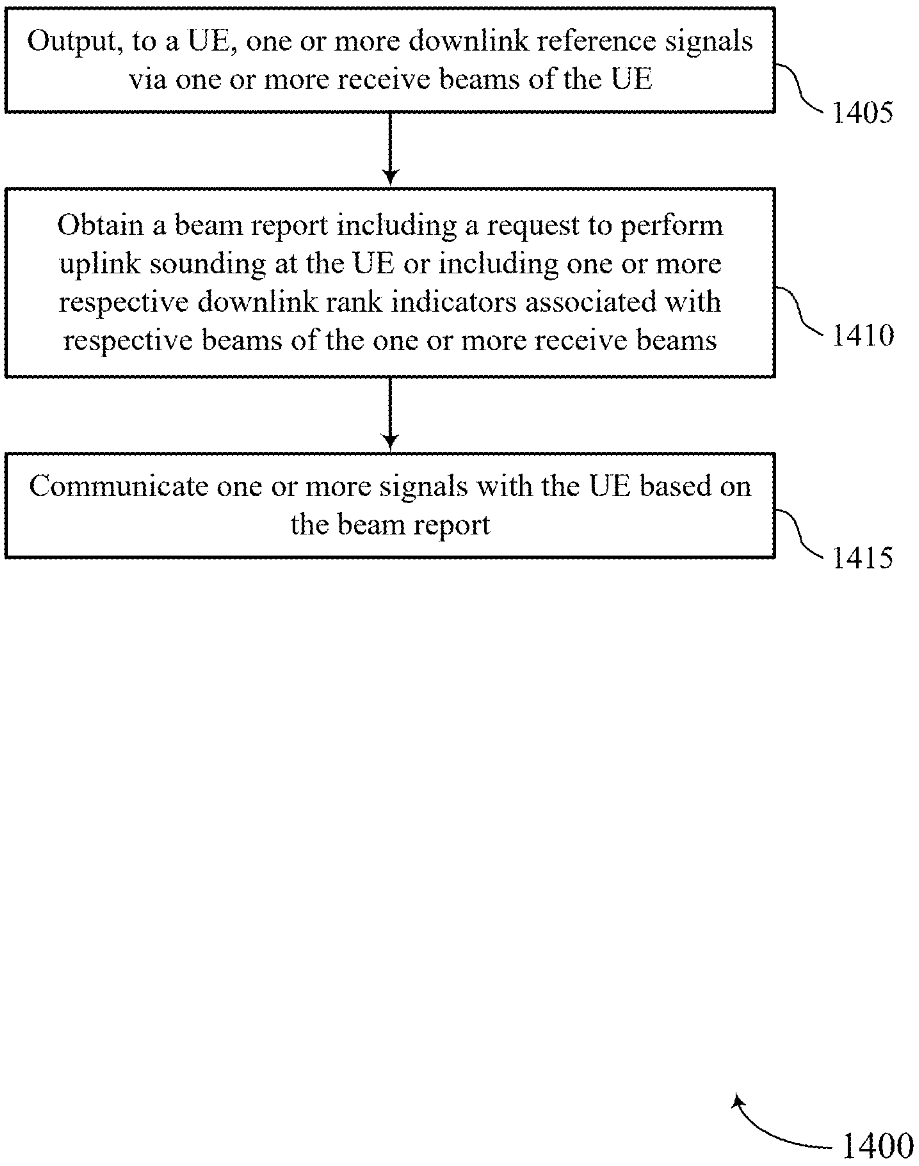

FIG. 14 shows a flowchart illustrating a method 1400 that supports beam-based spatial adaption with asymmetric antenna panels in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include outputting, to a UE, one or more DLRS via one or more receive beams of the UE. The operations of 1405 may be performed in accordance with examples as disclosed herein. In some examples, aspects of the operations of 1405 may be performed by a reference signal manager 1125 as described with reference to FIG. 11.

At 1410, the method may include obtaining a beam report including a request to perform uplink sounding at the UE or including one or more respective downlink rank indicators associated with respective beams of the one or more receive beams. The operations of 1410 may be performed in accordance with examples as disclosed herein. In some examples, aspects of the operations of 1410 may be performed by a beam report manager 1130 as described with reference to FIG. 11.

At 1415, the method may include communicating one or more signals with the UE based on the beam report. The operations of 1415 may be performed in accordance with examples as disclosed herein. In some examples, aspects of the operations of 1415 may be performed by a signaling manager 1135 as described with reference to FIG. 11.

The following provides an overview of aspects of the present disclosure:

Aspect 1: A method for wireless communications at a UE, comprising: receiving, from a network entity, one or more DLRS via one or more receive beams of the UE; performing one or more measurements of the one or more DLRS; and transmitting a beam report based at least in part on a capability of the UE and on the one or more measurements of the one or more DLRS, the beam report comprising a request to perform uplink sounding at the UE or comprising one or more respective downlink rank indicators associated with respective beams of the one or more receive beams.

Aspect 2: The method of aspect 1, wherein transmitting the beam report comprises: transmitting the beam report comprising the request to perform uplink sounding at the UE based at least in part on a change in a quantity of antenna components of the UE per reference signal port.

Aspect 3: The method of any of aspects 1 through 2, further comprising: transmitting an SRS based at least in part on the beam report comprising the request to perform uplink sounding at the UE, wherein the SRS is scheduled within a quantity of symbols after transmission of the beam report.

Aspect 4: The method of any of aspects 1 through 3, further comprising: receiving, from the network entity, an indication of a configuration of one or more trigger conditions for the UE, wherein satisfaction of the one or more trigger conditions triggers the UE to transmit the beam report comprising the request to perform uplink sounding at the UE, wherein the one or more trigger conditions comprise a change in a quantity of antenna components of the UE per reference signal port satisfying a threshold, a quantity of slots prior to transmission of the beam report, or any combination thereof.

Aspect 5: The method of aspect 4, wherein the configuration indicates that, to transmit the beam report, the threshold for the change in the quantity of antenna components of the UE is satisfied within a quantity of slots before the UE is scheduled to transmit the beam report comprising the request to perform uplink sounding at the UE.

Aspect 6: The method of any of aspects 1 through 5, wherein transmitting the beam report comprises: transmitting a reporting quantity dedicated for the request to perform uplink sounding at the UE or for the one or more respective downlink rank indicators based at least in part on a capability of the UE to support uplink communications using multiple antenna panels.

Aspect 7: The method of any of aspects 1 through 6, wherein transmitting the beam report comprises: transmitting a single bit indicating the request to perform uplink sounding at the UE.

Aspect 8: The method of any of aspects 1 through 7, wherein transmitting the beam report comprises: transmitting a plurality of bits indicating the one or more respective downlink rank indicators associated with the respective beams of the one or more receive beams.

Aspect 9: The method of any of aspects 1 through 8, further comprising: performing a prediction procedure using a machine learning model to predict a change in a quantity of antenna components of the UE; and transmitting the beam report comprising the request to perform uplink sounding at the UE based at least in part on predicting the change in the quantity of antenna components of the UE.

Aspect 10: The method of any of aspects 1 through 9, further comprising: transmitting a prediction confidence or a sounding pattern associated with uplink sounding at the UE to the network entity.

Aspect 11: The method of any of aspects 1 through 10, further comprising: transmitting the request to perform uplink sounding at the UE via UCI signaling or a MAC-CE.

Aspect 12: A method for wireless communications at a network entity, comprising: outputting, to a UE, one or more DLRS via one or more receive beams of the UE; obtaining a beam report comprising a request to perform uplink sounding at the UE or comprising one or more respective downlink rank indicators associated with respective beams of the one or more receive beams; and communicating one or more signals with the UE based at least in part on the beam report.

Aspect 13: The method of aspect 12, wherein communicating the one or more signals comprises: outputting scheduling information for one or more subsequent downlink messages from the network entity based at least in part on the one or more respective downlink rank indicators.

Aspect 14: The method of any of aspects 12 through 13, wherein communicating the one or more signals comprises: outputting scheduling information for an SRS based at least in part on the beam report comprising the request to perform uplink sounding at the UE, wherein the network entity schedules the SRS within a quantity of symbols after reception of beam report.

Aspect 15: The method of any of aspects 12 through 14, further comprising: outputting, to the UE, an indication of a configuration of one or more trigger conditions for the UE, wherein satisfaction of the one or more trigger conditions triggers the UE to transmit the beam report comprising the request to perform uplink sounding at the UE, wherein the one or more trigger conditions comprise a change in a quantity of antenna components of the UE per reference signal port satisfying a threshold, a quantity of slots prior to transmission of the beam report, or any combination thereof.

Aspect 16: The method of aspect 15, wherein the configuration indicates that, to transmit the beam report, the threshold for the change in the quantity of antenna elements of the UE is satisfied within a quantity of slots before the UE is scheduled to transmit the beam report comprising the request to perform uplink sounding at the UE.

Aspect 17: A UE for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the UE to perform a method of any of aspects 1 through 11.

Aspect 18: A UE for wireless communications, comprising at least one means for performing a method of any of aspects 1 through 11.

Aspect 19: A non-transitory computer-readable medium storing code for wireless communications, the code comprising instructions executable by one or more processors (e.g., directly, indirectly, after pre-processing, without pre-processing) to perform a method of any of aspects 1 through 11.

Aspect 20: A network entity for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the network entity to perform a method of any of aspects 12 through 16.

Aspect 21: A network entity for wireless communications, comprising at least one means for performing a method of any of aspects 12 through 16.

Aspect 22: A non-transitory computer-readable medium storing code for wireless communications, the code comprising instructions executable by one or more processors (e.g., directly, indirectly, after pre-processing, without pre-processing) to perform a method of any of aspects 12 through 16.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, a NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive, from a network entity, one or more downlink reference signals via one or more receive beams of the UE;

perform one or more measurements of the one or more downlink reference signals; and transmit a beam report based at least in part on a capability of the UE, the one or more measurements of the one or more downlink reference signals, and a change in a quantity of antenna components of the UE per reference signal port, the beam report comprising a request to perform uplink sounding at the UE or comprising one or more respective downlink rank indicators associated with respective beams of the one or more receive beams.

2. The UE of claim 1, wherein, to transmit the beam report, the one or more processors are individually or collectively operable to execute the code to cause the UE to:

transmit the beam report comprising the request to perform uplink sounding at the UE based at least in part on the change in the quantity of antenna components of the UE per reference signal port.

3. The UE of claim 1, wherein the one or more processors are individually or collectively further operable to execute the code to cause the UE to:

transmit a sounding reference signal (SRS) based at least in part on the beam report comprising the request to perform uplink sounding at the UE, wherein the SRS is scheduled within a quantity of symbols after transmission of the beam report.

4. The UE of claim 1, wherein the one or more processors are individually or collectively further operable to execute the code to cause the UE to:

receive, from the network entity, an indication of a configuration of one or more trigger conditions for the UE, wherein satisfaction of the one or more trigger conditions triggers the UE to transmit the beam report comprising the request to perform uplink sounding at the UE, wherein the one or more trigger conditions comprise the change in the quantity of antenna components of the UE per reference signal port satisfying a threshold, a quantity of slots prior to transmission of the beam report, or any combination thereof.

5. The UE of claim 4, wherein the configuration indicates that, to transmit the beam report, the threshold for the change in the quantity of antenna components of the UE is satisfied within a quantity of slots before the UE is scheduled to transmit the beam report comprising the request to perform uplink sounding at the UE.

6. The UE of claim 1, wherein, to transmit the beam report, the one or more processors are individually or collectively operable to execute the code to cause the UE to:

transmit a reporting quantity dedicated for the request to perform uplink sounding at the UE or for the one or more respective downlink rank indicators based at least in part on a capability of the UE to support uplink communications using multiple antenna panels.

7. The UE of claim 1, wherein, to transmit the beam report, the one or more processors are individually or collectively operable to execute the code to cause the UE to:

transmit a single bit indicating the request to perform uplink sounding at the UE.

8. The UE of claim 1, wherein, to transmit the beam report, the one or more processors are individually or collectively operable to execute the code to cause the UE to:

transmit a plurality of bits indicating the one or more respective downlink rank indicators associated with the respective beams of the one or more receive beams.

9. The UE of claim 1, wherein the one or more processors are individually or collectively further operable to execute the code to cause the UE to:

perform a prediction procedure using a machine learning model to predict a change in a quantity of antenna components of the UE; and transmit the beam report comprising the request to perform uplink sounding at the UE based at least in part on predicting the change in the quantity of antenna components of the UE.

10. The UE of claim 1, wherein the one or more processors are individually or collectively further operable to execute the code to cause the UE to:

transmit a prediction confidence or a sounding pattern associated with uplink sounding at the UE to the network entity.

11. The UE of claim 1, wherein the one or more processors are individually or collectively further operable to execute the code to cause the UE to:

transmit the request to perform uplink sounding at the UE via uplink control information (UCI) signaling or a medium access control-control element (MAC-CE).

12. A network entity, comprising:

one or more memories storing processor-executable code; and one or more processors coupled with the one or more memories and individually or collectively operable to execute the code to cause the network entity to:

output, to a user equipment (UE), one or more downlink reference signals via one or more receive beams of the UE;

obtain a beam report based at least in part on a change in a quantity of antenna components of the UE per reference signal port, the beam report comprising a request to perform uplink sounding at the UE or comprising one or more respective downlink rank indicators associated with respective beams of the one or more receive beams; and communicate one or more signals with the UE based at least in part on the beam report.

13. The network entity of claim 12, wherein, to communicate the one or more signals, the one or more processors are individually or collectively operable to execute the code to cause the network entity to:

output scheduling information for one or more subsequent downlink messages from the network entity based at least in part on the one or more respective downlink rank indicators.

14. The network entity of claim 12, wherein, to communicate the one or more signals, the one or more processors are individually or collectively operable to execute the code to cause the network entity to:

output scheduling information for a sounding reference signal (SRS) based at least in part on the beam report comprising the request to perform uplink sounding at the UE, wherein the network entity schedules the SRS within a quantity of symbols after reception of beam report.

15. The network entity of claim 12, wherein the one or more processors are individually or collectively further operable to execute the code to cause the network entity to:

output, to the UE, an indication of a configuration of one or more trigger conditions for the UE, wherein satisfaction of the one or more trigger conditions triggers the UE to transmit the beam report comprising the request to perform uplink sounding at the UE, wherein the one or more trigger conditions comprise the change in the quantity of antenna components of the UE per reference signal port satisfying a threshold, a quantity of slots prior to transmission of the beam report, or any combination thereof.

16. The network entity of claim 15, wherein the configuration indicates that, to transmit the beam report, the threshold for the change in the quantity of antenna elements of the UE is satisfied within a quantity of slots before the UE is scheduled to transmit the beam report comprising the request to perform uplink sounding at the UE.

17. A method for wireless communications at a user equipment (UE), comprising:

receiving, from a network entity, one or more downlink reference signals via one or more receive beams of the UE;

performing one or more measurements of the one or more downlink reference signals; and transmitting a beam report based at least in part on a capability of the UE, the one or more measurements of the one or more downlink reference signals, and a change in a quantity of antenna components of the UE per reference signal port, the beam report comprising a request to perform uplink sounding at the UE or comprising one or more respective downlink rank indicators associated with respective beams of the one or more receive beams.

18. The method of claim 17, wherein transmitting the beam report comprises:

transmitting the beam report comprising the request to perform uplink sounding at the UE based at least in part on the change in the quantity of antenna components of the UE per reference signal port.

19. The method of claim 17, further comprising:

transmitting a sounding reference signal (SRS) based at least in part on the beam report comprising the request to perform uplink sounding at the UE, wherein the SRS is scheduled within a quantity of symbols after transmission of the beam report.

20. The method of claim 17, further comprising:

receiving, from the network entity, an indication of a configuration of one or more trigger conditions for the UE, wherein satisfaction of the one or more trigger conditions triggers the UE to transmit the beam report comprising the request to perform uplink sounding at the UE, wherein the one or more trigger conditions comprise the change in the quantity of antenna components of the UE per reference signal port satisfying a threshold, a quantity of slots prior to transmission of the beam report, or any combination thereof.

21. The method of claim 20, wherein the configuration indicates that, to transmit the beam report, the threshold for the change in the quantity of antenna components of the UE is satisfied within a quantity of slots before the UE is scheduled to transmit the beam report comprising the request to perform uplink sounding at the UE.

22. The method of claim 17, wherein transmitting the beam report comprises:

transmitting a reporting quantity dedicated for the request to perform uplink sounding at the UE or for the one or more respective downlink rank indicators based at least in part on a capability of the UE to support uplink communications using multiple antenna panels.

23. The method of claim 17, wherein transmitting the beam report comprises:

transmitting a single bit indicating the request to perform uplink sounding at the UE.

24. The method of claim 17, wherein transmitting the beam report comprises:

transmitting a plurality of bits indicating the one or more respective downlink rank indicators associated with the respective beams of the one or more receive beams.

25. The method of claim 17, further comprising:

performing a prediction procedure using a machine learning model to predict a change in a quantity of antenna components of the UE; and transmitting the beam report comprising the request to perform uplink sounding at the UE based at least in part on predicting the change in the quantity of antenna components of the UE.

26. A method for wireless communications at a network entity, comprising:

outputting, to a user equipment (UE), one or more downlink reference signals via one or more receive beams of the UE;

obtaining a beam report based at least in part on a change in a quantity of antenna components of the UE per reference signal port, the beam report comprising a request to perform uplink sounding at the UE or comprising one or more respective downlink rank indicators associated with respective beams of the one or more receive beams; and communicating one or more signals with the UE based at least in part on the beam report.

27. The method of claim 26, wherein communicating the one or more signals comprises:

outputting scheduling information for one or more subsequent downlink messages from the network entity based at least in part on the one or more respective downlink rank indicators.

28. The method of claim 26, wherein communicating the one or more signals comprises:

outputting scheduling information for a sounding reference signal (SRS) based at least in part on the beam report comprising the request to perform uplink sounding at the UE, wherein the network entity schedules the SRS within a quantity of symbols after reception of beam report.

29. The method of claim 26, further comprising:

outputting, to the UE, an indication of a configuration of one or more trigger conditions for the UE, wherein satisfaction of the one or more trigger conditions triggers the UE to transmit the beam report comprising the request to perform uplink sounding at the UE, wherein the one or more trigger conditions comprise the change in the quantity of antenna components of the UE per reference signal port satisfying a threshold, a quantity of slots prior to transmission of the beam report, or any combination thereof.

30. The method of claim 29, wherein the configuration indicates that, to transmit the beam report, the threshold for the change in the quantity of antenna elements of the UE is satisfied within a quantity of slots before the UE is scheduled to transmit the beam report comprising the request to perform uplink sounding at the UE.

* * * * *